United States Patent
Yim et al.

(10) Patent No.: US 9,559,363 B2
(45) Date of Patent: Jan. 31, 2017

(54) METHOD FOR PREPARING CATALYST LAYER BY IN-SITU SOL-GEL REACTION OF TETRAETHOXYSILANE IN NAFION IONOMER SOLUTION

(71) Applicant: KOREA INSTITUTE OF ENERGY RESEARCH, Daejeon (KR)

(72) Inventors: Sung-Dae Yim, Daejeon (KR); Taeyoung Kim, Daejeon (KR); Seok-Hee Park, Daejeon (KR); Young-Gi Yoon, Daejeon (KR); Gu-Gon Park, Daejeon (KR); Tae-Hyun Yang, Daejeon (KR); Young-Woo Choi, Chungcheonbuk-do (KR); Byung-Chan Bae, Seoul (KR); Young-Jun Son, Daejeon (KR); Min-Jin Kim, Daejeon (KR); Chang-Soo Kim, Incheon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 13/742,975

(22) Filed: Jan. 16, 2013

(65) Prior Publication Data
US 2014/0023952 A1 Jan. 23, 2014

(30) Foreign Application Priority Data

Jul. 20, 2012 (KR) .................. 10-2012-0079169

(51) Int. Cl.
*H01M 8/10* (2016.01)
*H01M 4/88* (2006.01)
*H01M 4/86* (2006.01)

(52) U.S. Cl.
CPC ......... *H01M 4/8828* (2013.01); *H01M 4/8663* (2013.01); *H01M 4/8668* (2013.01); *H01M 4/881* (2013.01); *H01M 8/1004* (2013.01); *H01M 8/1051* (2013.01); *H01M 8/1072* (2013.01); *Y02E 60/521* (2013.01); *Y02P 70/56* (2015.11)

(58) Field of Classification Search
CPC .. H01M 8/1004; H01M 4/8663; H01M 4/881; H01M 4/8828; H01M 8/1051; H01M 8/1072
USPC ........................ 429/482, 483, 488
See application file for complete search history.

(56) References Cited

U.S. PATENT DOCUMENTS

| 8,187,745 B2 | 5/2012 | Tamura et al. |
|---|---|---|
| 2009/0107330 A1* | 4/2009 | Gu .................................. 95/55 |
| 2010/0092840 A1* | 4/2010 | Konno et al. ................... 429/40 |
| 2010/0178583 A1* | 7/2010 | Han et al. ...................... 429/483 |
| 2010/0196790 A1* | 8/2010 | Kawakami .......... H01M 4/8663 429/483 |

(Continued)

FOREIGN PATENT DOCUMENTS

JP 2010-10101 1/2010

*Primary Examiner* — Jonathan Jelsma
(74) *Attorney, Agent, or Firm* — Alston & Bird LLP

(57) ABSTRACT

Provided are a method for preparing a catalyst layer by an in-situ sol-gel reaction of tetraethoxysilane, and a fuel cell including the catalyst layer prepared thereby. Addition of silica mitigates specific adsorption of sulfonate groups contained in a Nafion ionomer on a Pt catalyst layer in a high-voltage region where the role of a catalyst predominates, resulting in improvement of ORR performance.

2 Claims, 27 Drawing Sheets

(56) References Cited

U.S. PATENT DOCUMENTS

2011/0200914 A1* 8/2011 Wang et al. .................. 429/523

* cited by examiner

METHOD FOR PREPARING CATALYST LAYER BY IN-SITU SOL-GEL REACTION OF TETRAETHOXYSILANE IN NAFION IONOMER SOLUTION

CROSS-REFERENCE TO RELATED APPLICATIONS

This application claims priority under 35 U.S.C. §119 to Korean Patent Application No. 10-2012-0079169, filed on Jul. 20, 2012, in the Korean Intellectual Property Office, the disclosure of which is incorporated herein by reference in its entirety.

TECHNICAL FIELD

The following disclosure relates to a method for preparing a catalyst layer by an in-situ sol-gel reaction of tetraethoxysilane, and a fuel cell including the catalyst layer prepared thereby.

BACKGROUND

Recently, high temperature operations with low humidification levels for polymer electrolyte fuel cells (PEFCs) have received a great deal of attention, because they have potential for solving the problem of CO poisoning, enhance electrochemical reactions, simplify the design of water and thermal subsystems and reduce the cost of PEFCs. Despite the fact that Nafion-based membranes are the best performing, commercially available polymer electrolytes, the development of other polymer membranes and ionomer binders having excellent durability even at high temperature conditions is in urgent need for alternative proton conductive materials due to the instability of Nafion-based polymers at elevated temperatures. For example, it is expected that hydrocarbon-based polymers substitute for such materials.

However, extensive studies have reported that a hydrocarbon-based ionomer binder is not appropriate for use in catalyst layers because of the strong adsorption of the aromatic rings and sulfonate groups ($-SO_3H$) of the hydrocarbon-based ionomer on the Pt catalyst surface, which leads to significant inhibition of the oxygen reduction reaction (ORR). Furthermore, when the hydrocarbon-based binder is used in a catalyst layer under a high-relative humidity condition, the low diffusion coefficient of water and the high swelling property and low gas permeability of the hydrocarbon-based ionomer binder in the catalyst layer have detrimental effects on the efficient oxygen mass transport. Although hydrocarbon polymers having polar groups have high water uptakes over a wide temperature range, the absorbed water is restricted to the polar groups of the polymer chains. Thus, relative humidity conditions have a greater effect on the water retention and proton conductivity of the hydrocarbon ionomer as compared to the Nafion ionomer. This restricts the application of hydrocarbon ionomers to catalyst layer binders under low humidity conditions. Under these circumstances, it is expected that Nafion ionomers rather than hydrocarbon-based ionomers are used as binders in PEFCs even though they have low durability under high-temperature conditions. In addition, Nafion may be affected by reduced ORR quality of Pt catalysts due to the specific adsorption phenomenon caused by sulfonate groups. Thus, it is required to solve this problem. This is because enhancing ORR quality of Pt catalysts by mitigating the specific adsorption significantly reduces the amount of Pt required to be supported on a carrier during the manufacture of a membrane electrode assembly (MEA) for fuel cells.

However, the proton conductivity of Nafion ionomers is commonly altered dramatically under low humidity conditions. One promising strategy to increase the water content in the polymer matrix is to incorporate nanometer-sized particles of hygroscopic metal oxides into the cathode and/or anode catalyst layers. The incorporation of hygroscopic metal oxides is usually conducted by dispersing the nanoparticles synthesized by an ex situ sol-gel process. However, a notable issue is that hygroscopic oxide particles synthesized by ex situ sol-gel reactions may be easily lost or may significantly aggregate in a catalyst layer since the oxide particles are just simply mixed and not immobilized in these electrodes during the operation of a fuel cell. This results in degradation of the quality of a fuel cell during its operation. Furthermore, the addition of excessive oxide particles may cause a significant increase in the interfacial contact resistance between the catalyst layer and the polymer membrane, resulting in significant degradation of the quality of a fuel cell. When a large amount of oxide particles are incorporated to a catalyst layer, they may deteriorate the charge transfer dynamics (i.e., proton and electron transfer) of the electrodes due to the insulating properties of the oxide particles. To solve this, it is required that such hygroscopic metal oxide particles having a nanometer-scaled size are dispersed uniformly without aggregation among themselves.

SUMMARY

An embodiment of the present disclosure is directed to providing a solution to overcome the above-mentioned problems according to the related art. More particularly, self-assembly between positively charged $SiOH_2^+$, derived from an in situ sol-gel process with tetraethoxysilane (TEOS) at pH<1 and negatively charged sulfonate groups of a Nafion ionomer enables production of silica particles with a very small size. Further, improvement in the performance of an MEA at low humidity using the silica particles is determined and the MEA provided herein is characterized.

In one general aspect, there is provided a membrane-electrode assembly for a fuel cell including a cathode, an anode and an electrolyte membrane disposed between the cathode and the anode, wherein the cathode includes a first support and a cathode electrode catalyst layer, the anode includes a second support and an anode electrode catalyst layer, a hygroscopic inorganic material is contained in the cathode electrode catalyst layer, and no hygroscopic inorganic material is contained in the anode electrode catalyst layer.

In another general aspect, there is provided a membrane-electrode assembly for a fuel cell including a cathode, an anode and an electrolyte membrane disposed between the cathode and the anode, wherein the cathode includes a first support and a cathode electrode catalyst layer, the anode includes a second support and an anode electrode catalyst layer, a hygroscopic inorganic material is contained in the cathode electrode catalyst layer, and the hygroscopic inorganic material is amorphous silica nanoparticles having an average particle size of 5 nm or less.

In still another general aspect, there is provided a method for producing a membrane-electrode assembly for a fuel cell, including: forming a dispersion by dispersing Pt/C and Nafion into an aqueous alcoholic solution; adding a TEOS solution and Nafion ionomer to the dispersion to provide a catalyst ink; and forming a catalyst layer on an electrolyte membrane by using the catalyst ink.

The present disclosure provides the following effects:

Addition of silica mitigates specific adsorption of sulfonate groups contained in a Nafion ionomer on a Pt catalyst layer in a high-voltage region where the role of a catalyst predominates, resulting in improvement of ORR performance.

While the related art is merely directed to improvement under low-humidity conditions by introducing an inorganic material, the present disclosure provides improvement of the ORR performance in a high-voltage range of a Pt catalyst not only under low-humidity conditions but also under normal operating conditions, resulting in reduction of catalyst consumption.

Addition of silica leads to a change in direction of net water transport into a direction toward an anode from a cathode due to a difference in water concentration between a cathode and an anode. This helps a membrane disposed between the cathode and the anode not to be dried, resulting in significant improvement of the quality of an MEA under low-humidity conditions.

While externally synthesized $SiO_2$ is added during the preparation of catalyst slurry according to the related art, a silica precursor (TEOS) is added during the preparation of catalyst slurry according to the present disclosure. This allows Nafion to be utilized as an acid catalyst by virtue of its low pH and causes hydrolysis of TEOS on MEA catalyst slurry. Particularly, a Nafion ionomer and a silica surface undergo self-assembly with each other due to their potential characteristics, thereby preventing silica particles from forming large particle aggregates. As a result, the silica formed according to the present disclosure has a very small size less than 5 nm and is dispersed uniformly within an electrode layer. This solves aggregation of silica particles and provides benefits in terms of long-term operation.

Further, it is observed that the effect of silica addition upon improvement of the quality of an MEA is significantly higher when silica is applied only to a cathode as compared with those effects obtained when silica is applied only to an anode or to both electrodes.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 1 shows the TEOS solution. FIG. 1 illustrates that continuous hydrolysis—condensation reactions take place in the catalyst ink. FIG. 1 illustrates that the MEA is dried at 80° C. to remove the residual solvent and promote further condensation of the SiOH groups.

FIG. 6a shows high frequency resistance (HFR)-uncorrected polarization curves; FIG. 6b shows HFR-corrected polarization curves; FIG. 6c shows HFR values at 100% RH; FIG. 6d shows HFR values at 50% RH; and FIG. 6e and FIG. 6f show the cathode charge-transfer resistance ($R_{CT}$) of MEAs at 100% RH and 50% RH, respectively.

FIG. 14 shows photographic views of 2 wt % Nafion solution dissolved in IPA solvent, wherein FIG. 14 represents Nafion solution without silica, and FIG. 14 represents Nafion solution with silica.

Figure 18:
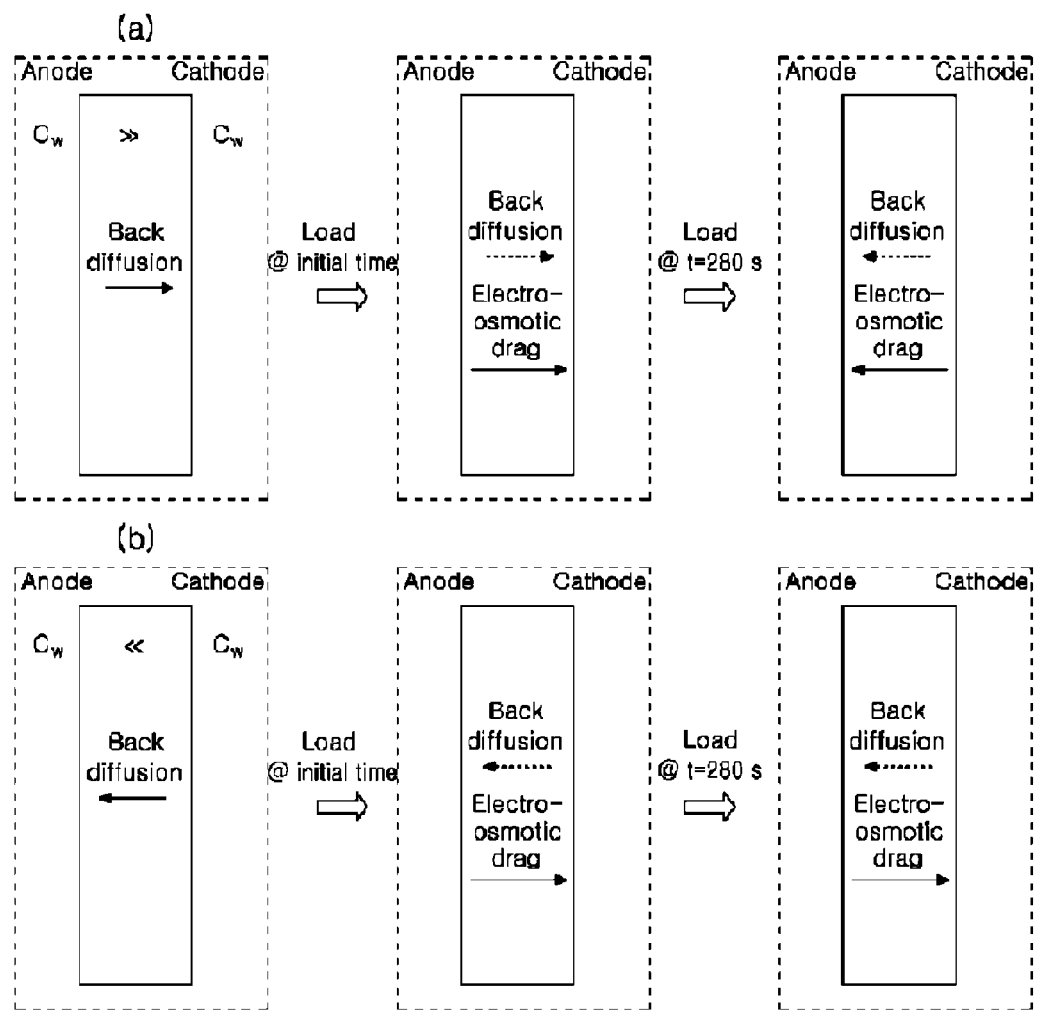

FIG. 18 shows schematic diagrams illustrating water transport at 50% RH through the MEA-A polymer membrane and through the MEA-C polymer membrane.

Figure 19A:
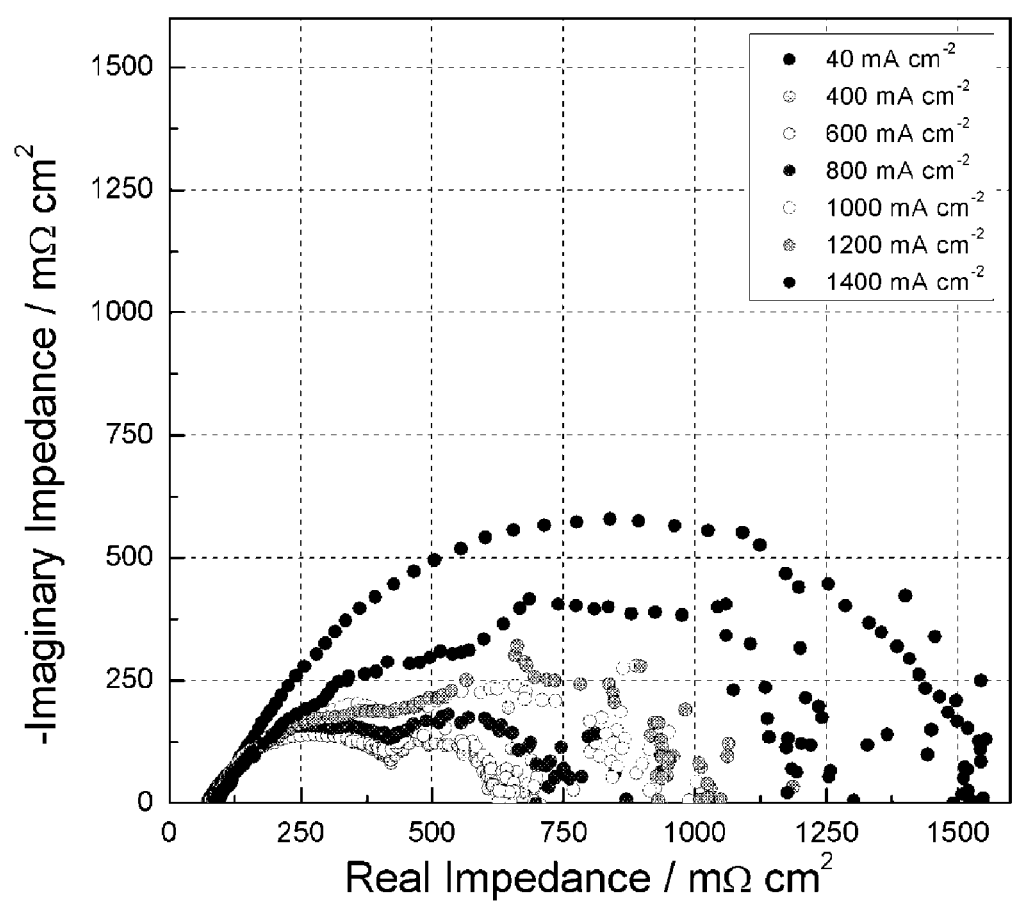
Figure 19B:
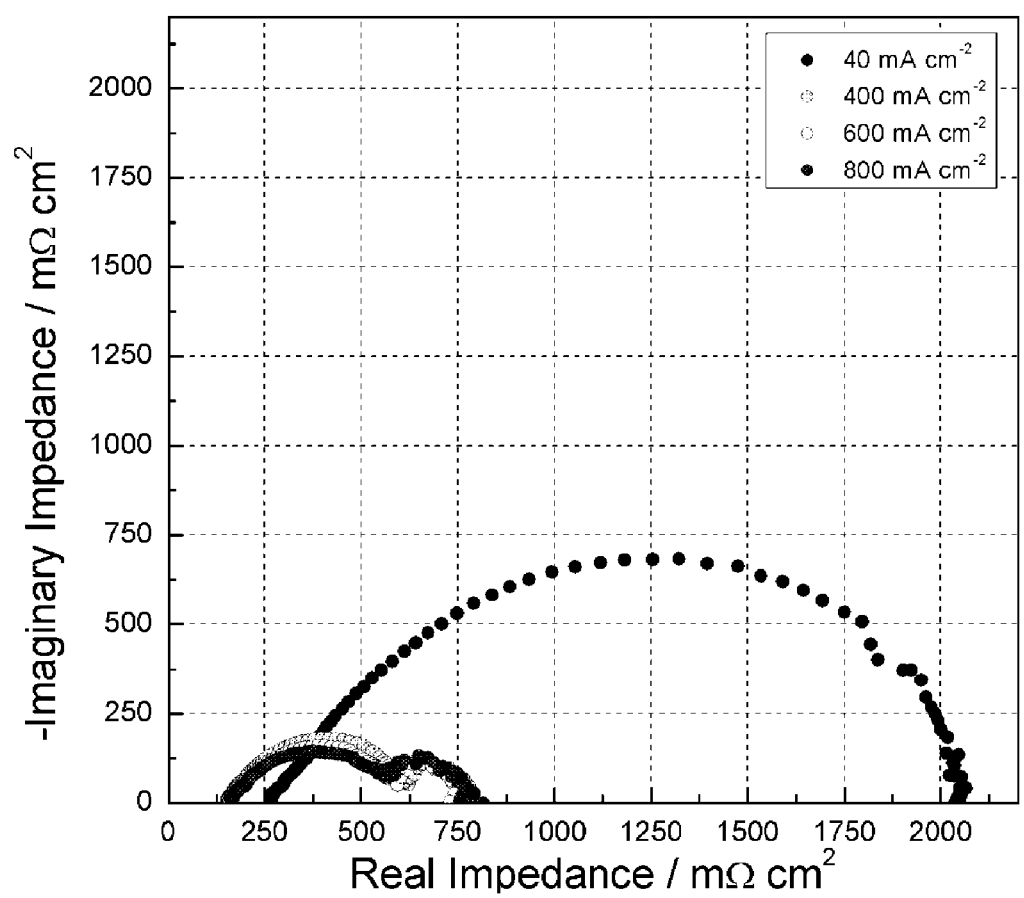

FIG. 19a-FIG. 19b show Nyquist plots of MEA-N at 100% RH (FIG. 19a) and at 50% RH (FIG. 19b).

Figure 20A:
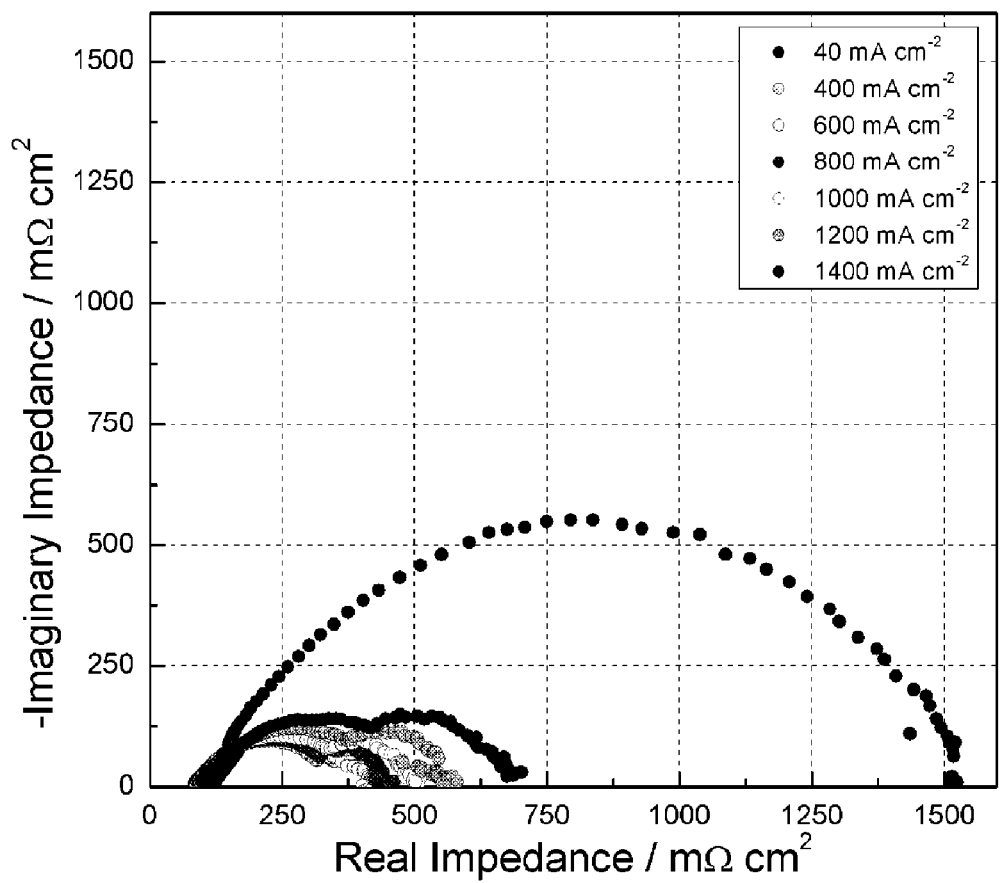
Figure 20B:
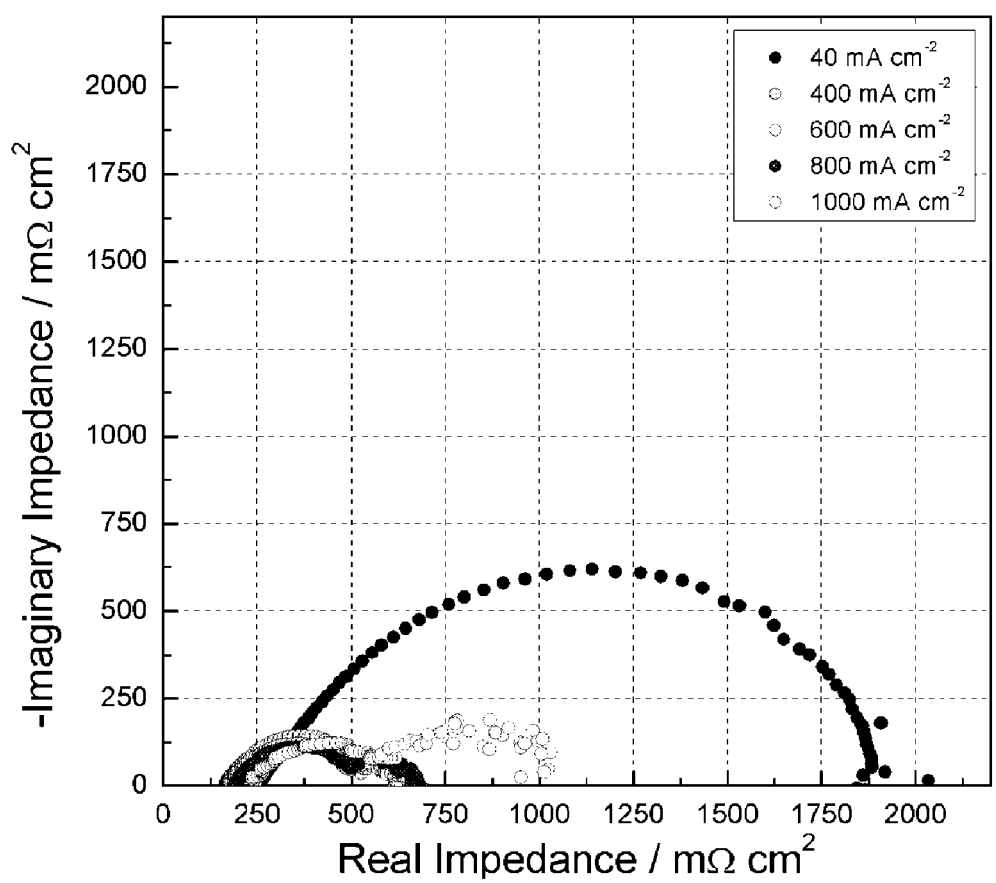

FIG. 20a-FIG. 20b show Nyquist plots of MEA-A at 100% RH (FIG. 20a) and at 50% RH (FIG. 20b).

Figure 21A:
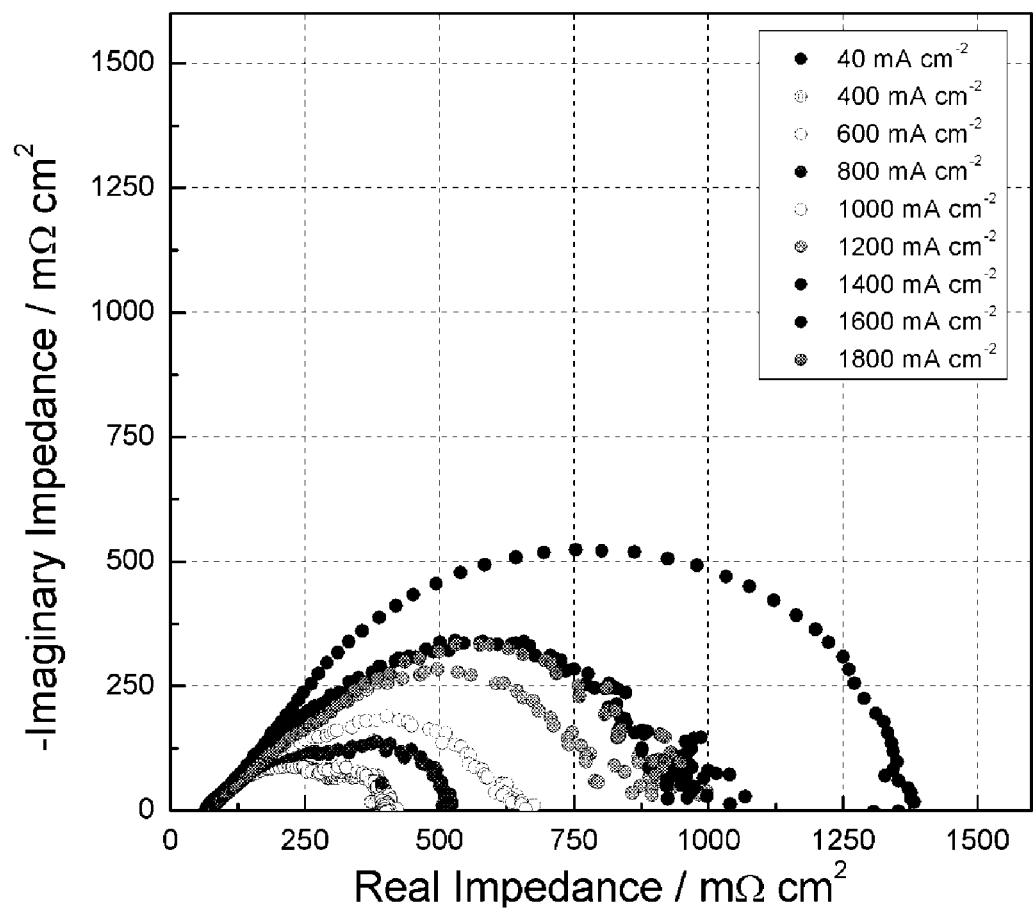
Figure 21B:
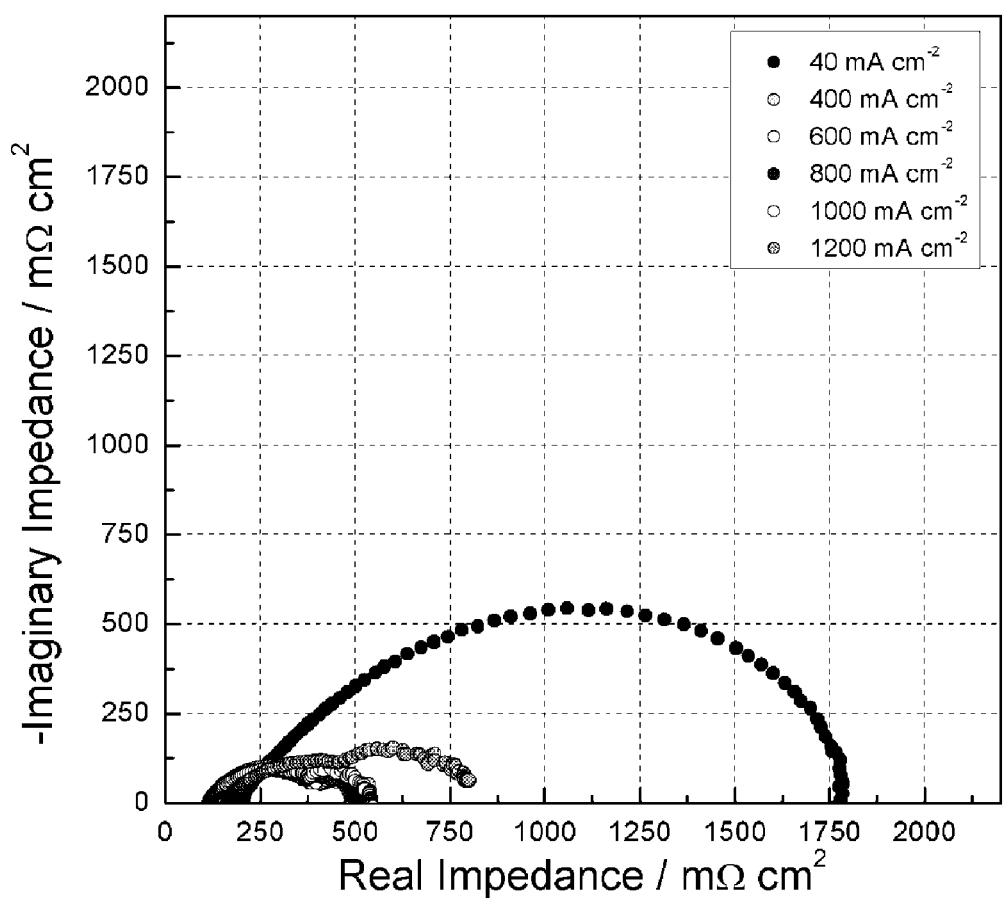

FIG. 21a-FIG. 21b show Nyquist plots of MEA-C at 100% RH (FIG. 21a) and at 50% RH (FIG. 21b).

Figure 22A:
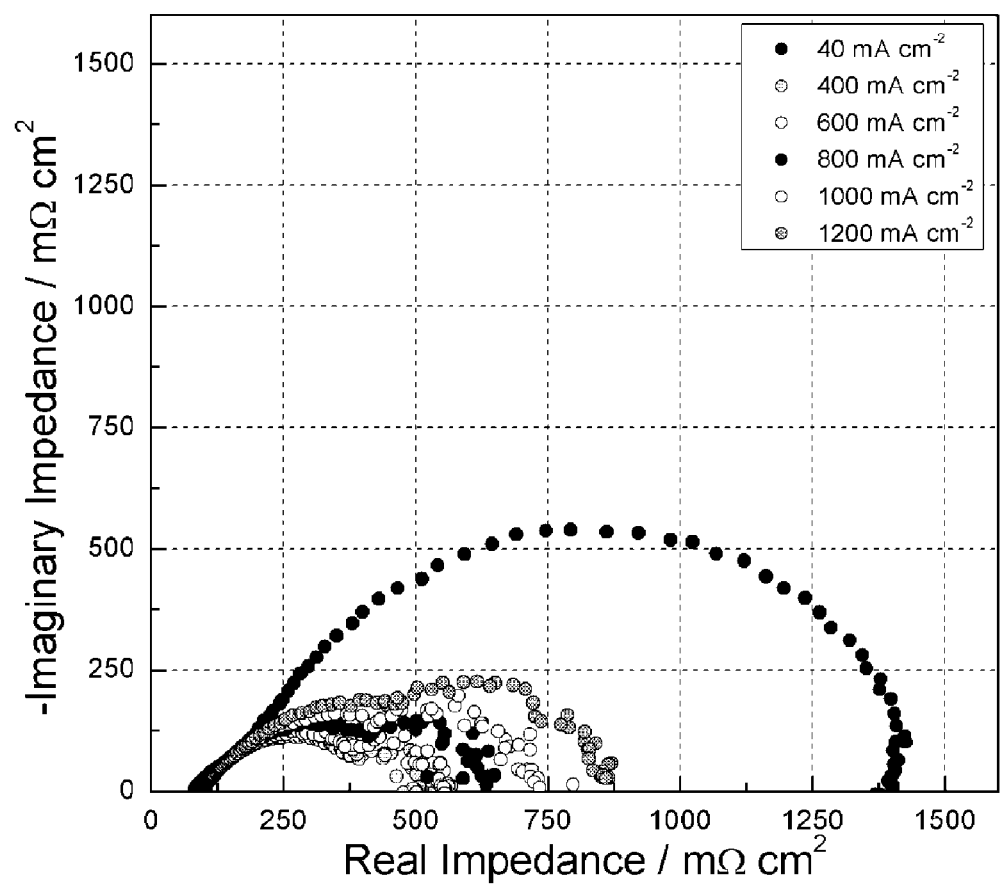
Figure 22B:
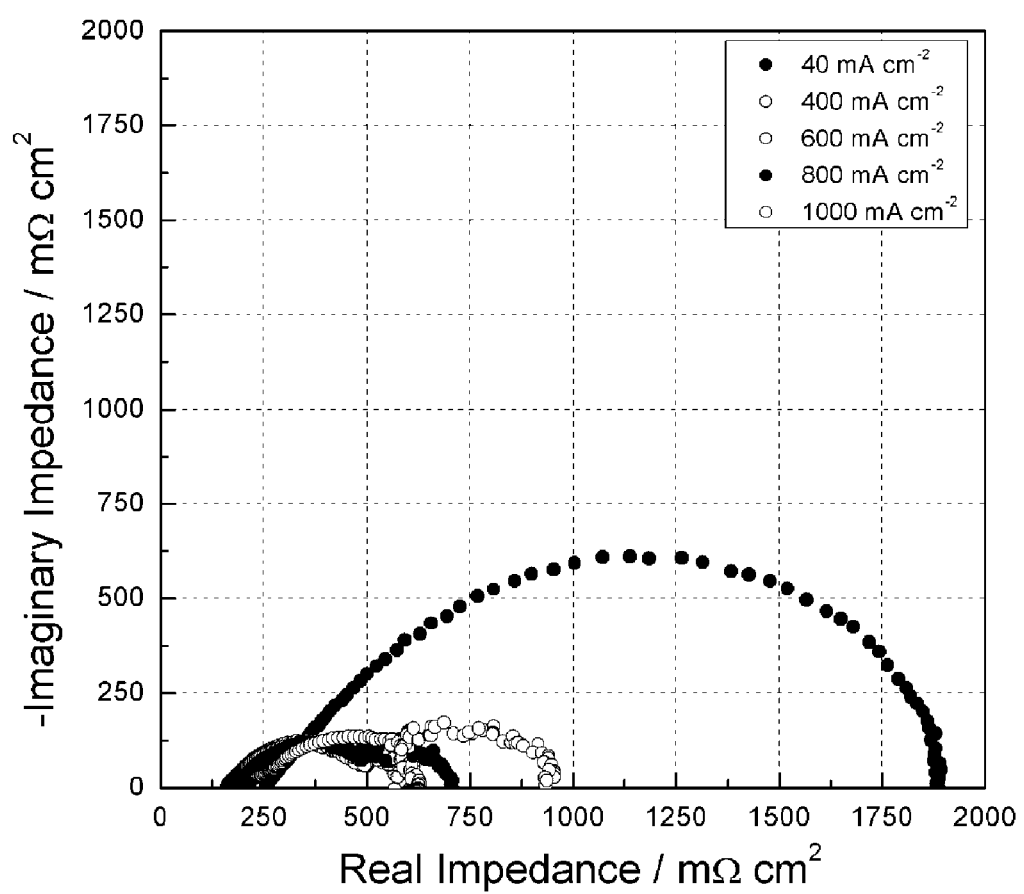

FIG. 22a-FIG. 22b show Nyquist plots of MEA-C/A at 100% RH (FIG. 22a) and at 50% RH (FIG. 22b).

DETAILED DESCRIPTION OF EMBODIMENTS

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

In one aspect, there is provided a membrane-electrode assembly for a fuel cell including a cathode, an anode and an electrolyte membrane disposed between the cathode and the anode, wherein the cathode includes a first support and a cathode electrode catalyst layer, the anode includes a second support and an anode electrode catalyst layer, a hygroscopic inorganic material is contained in the cathode electrode catalyst layer, and no hygroscopic inorganic material is contained in the anode electrode catalyst layer.

In another general aspect, there is provided a membrane-electrode assembly for a fuel cell including a cathode, an anode and an electrolyte membrane disposed between the cathode and the anode, wherein the cathode includes a first support and a cathode electrode catalyst layer, the anode includes a second support and an anode electrode catalyst layer, a hygroscopic inorganic material is contained in the cathode electrode catalyst layer, and the hygroscopic inorganic material is amorphous silica nanoparticles having an average particle size of 5 nm or less.

According to an embodiment of the membrane-electrode assembly for a fuel cell, the hygroscopic inorganic material may be silica nanoparticles, which are amorphous nanoparticles having an average particle size of 0.5-10 nm, preferably 1-5 nm.

According to another embodiment of the membrane-electrode assembly for a fuel cell, the silica nanoparticles may have a Q3/Q4 ratio of 1-3, preferably 1.5-2.5, more preferably 1.6-2, most preferably 1.65-1.75, and specifically 1.69-1.72 (based on $^{29}$Si NMR spectra). Herein, Q3 means the number of silicon atoms bonded to three other silicon atoms through oxygen, and Q4 means the number of silicon atoms bonded to four other silicon atoms through oxygen.

According to still another embodiment of the membrane-electrode assembly, the silica nanoparticles may be derived from TEOS, wherein no Si resonance peak is observed in $^{29}$Si NMR spectra for determination of non-hydrolyzed TEOS.

According to yet another embodiment of the membrane-electrode assembly, the electrode catalyst layers may provide a current density of 400-800 mA/cm$^2$, preferably 500-750 mA/cm$^2$, more preferably 600-700 mA/cm$^2$, and most preferably 650-670 mA/cm$^2$, at 0.6 V under 50% RH, and show a mass activity value of 15-25 A/g$_{pt}$, preferably 16-23 A/g$_{pt}$, more preferably 17-21 A/g$_{pt}$, and most preferably 18-20 A/g$_{pt}$, at 0.9 V$_{iR-free}$ under 50% RH.

In still another general aspect, there is provided a method for producing a membrane-electrode assembly for a fuel cell, including: forming a dispersion by dispersing Pt/C and Nafion into an aqueous alcoholic solution; adding a TEOS solution and Nafion ionomer to the dispersion to provide a catalyst ink; and forming a catalyst layer on an electrolyte membrane by using the catalyst ink.

Particularly, as compared with a two-step process wherein TEOS solution is introduced at the second step according to some embodiments of the present disclosure, it is observed that the one-step process including the following operations causes degradation of the final quality of a fuel cell as well as the quality of the resultant catalyst:

mixing Pt/C, 2-propanol (IPA), water and Nafion, and dispersing Pt/C and Nafion with ultrasonic waves to form a catalyst ink;

adding TEOS solution and solid Nafion ionomer to the catalyst ink; and forming a catalyst layer on an electrolyte membrane by using the catalyst ink, particularly by spraying the catalyst ink onto a Nafion membrane, followed by drying.

According to various embodiments of the present disclosure, TEOS is hydrolyzed in-situ and negatively charged sulfonate groups of Nafion are bound with positively charged silica through electrical attraction during the condensation reaction. Herein, bonding occurs via self-assembly. Such self-assembled silica has a very small size less than 5 nm and is dispersed uniformly in a catalyst layer without aggregation of silica particles.

In general, during the incorporation of inorganic materials into a catalyst layer, a notable issue is that the inorganic materials cause aggregation. However, it is to be noted that the present disclosure avoids such aggregation. In other words, the sulfonate groups contained in Nafion is weakly negatively charged and show specific adsorption on a platinum catalyst surface, resulting in degradation of Pt activity.

However, according to various embodiments of the present disclosure, the negatively charged sulfonate groups are distributed around the positively charged silica by way of self-assembly through electrical attraction, resulting in mitigation of specific adsorption of sulfonate groups on a Pt catalyst surface. This leads to a significant increase in Pt activity, resulting in a decrease in amount of Pt needed per unit area of catalyst.

In addition to such an increase in Pt activity, the —OH functional groups of silica participate in hydrogen bonding with water. Thus, the water contained in the silica is supplied to the catalyst layer and the polymer membrane under low humidity, thereby improving the low-humidity performance. In brief, according to various embodiments of the present disclosure, it is possible to increase the activity of a Pt catalyst significantly as well as to increase the water content of a polymer membrane under low humidity, resulting in overall improvement of the quality of a fuel cell.

According to a particular embodiment of the present disclosure, there is provided a composite catalyst layer including a Nafion ionomer self-assembled with SiOH$_2^+$, obtained from an in situ sol-gel process of tetraethoxysilane (TEOS) at pH<2.

One of the characteristics of the present disclosure is using no acid catalyst (e.g. HCl). It is observed that when an acid catalyst is used additionally, the resultant silica has an increased size and shows non-uniformity in shape.

According to the related art, it is shown that although silica captures and liberates water and is effective under low humidity, there is no significant improvement of the ORR performance of a catalyst. However, according to various embodiments of the present disclosure, it is possible to provide benefits under low humidity as well as to improve the ORR performance of a catalyst.

In the present disclosure, the significant enhancement of the water content of Nafion ionomers is determined under a dehydrated condition by preparing a novel composite catalyst layer including a Nafion ionomer self-assembled with $SiOH_2^+$, obtained from an in situ sol-gel process of tetraethoxysilane (TEOS) at pH<2. Further, it is verified that the experimental methods for measuring the water transport in the polymer membrane are applicable to all types of MEA. Most importantly, the method disclosed herein does not require an excessive amount of time or solvent to accomplish the sol-gel reaction of TEOS at high temperatures, as compared with ex situ methods that have been reported previously. To the best of our knowledge, there have been no studies that attempt to improve the performance of cells at low humidity with an MEA that utilizes in situ sol-gel processes of TEOS in a Nafion solution with Pt/C.

Figure 1:
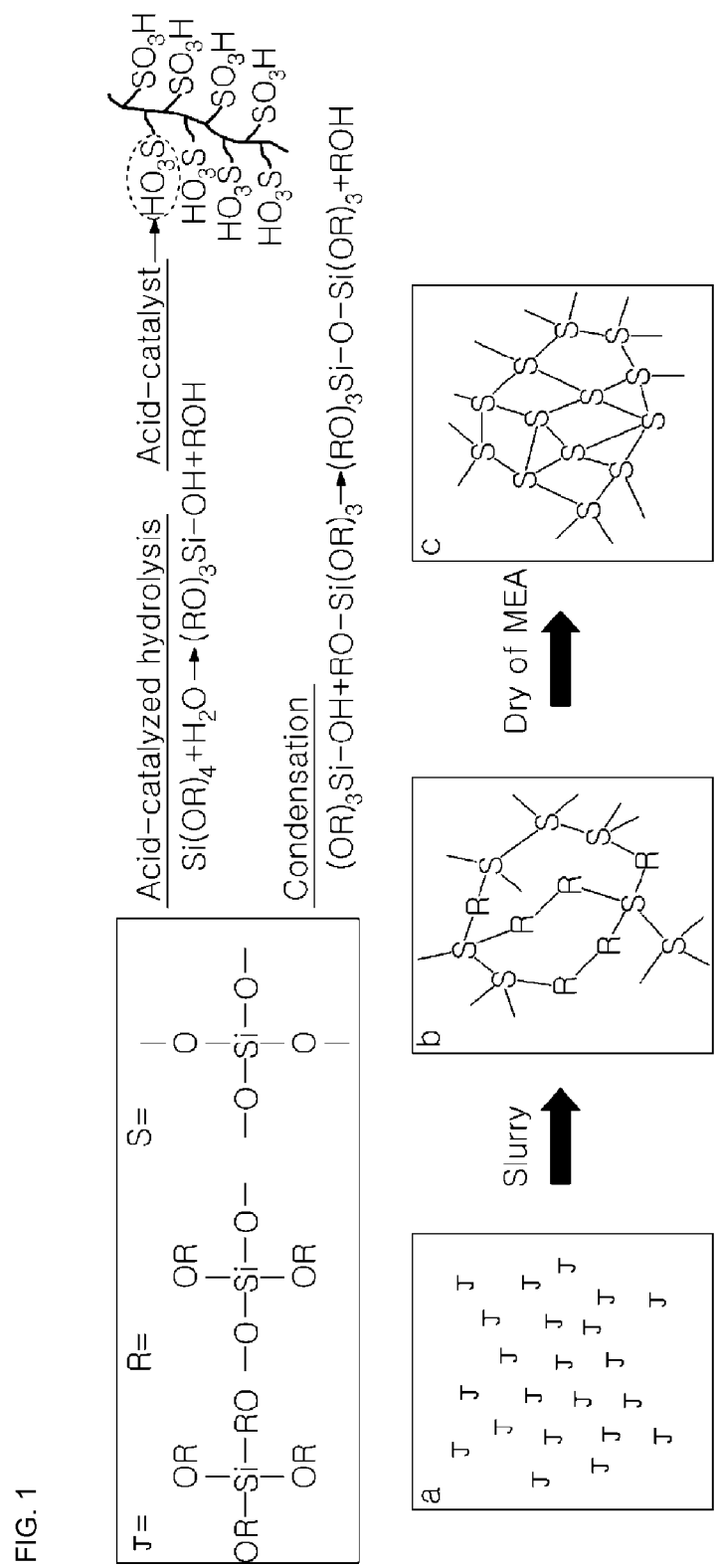
FIG. 1 shows schematic diagrams for the in situ sol-gel reactions of tetraethoxysilane (TEOS) in a Nafion ionomer solution. The —$SO_3H$ groups of Nafion polymer serve as a catalyst for the sol-gel reaction.

These approaches originate from in situ sol-gel processes, which include the following two steps: conducting the hydrolysis of TEOS in a solvent mixture containing a Nafion ionomer solution, alcohol and water; and carrying out polycondensation while drying the MEA. More specifically, the —$SO_3H$ protons, which are attached to the Nafion polymer, conveniently serve as catalysts for the hydrolysis reaction by virtue of the very high acidity of the perfluorinated side chain. Hydrolyzed alkoxysilanes migrate to the negatively charged sulfonate groups (—$SO_3^-$) due to a rapid increase in the zeta ($\zeta$) potential at pH<2, thereby forming a core-shell structure. In the catalyst ink, the strong stabilization and steric hindrance effect of self-assembled Nafion—$SiO_2$ prevent the grain growth of the $SiO_2$ nanoparticles, which leads to a uniform distribution of $SiO_2$ nanoparticles having a size of <5 nm in the electrode. After the catalyst ink is sprayed, it is dried at 80° C. to remove the residual solvent and further promote the condensation reaction (FIG. 1). Using this method, it is shown that the novel composite catalyst layer enhances the performance of the cell significantly, from 476 mA $cm^{-2}$ to 655 mA $cm^{-2}$ at 0.6 V under 50% RH, and improves the mass activity value from 8.3 A $g_{pt}^{-1}$ to 18.9 A $g_{pt}^{-1}$, at 0.9 $V_{iR-free}$ under 50% RH. Further, the specific activity increases from 52.5 µA $cm^{-2}$ to 122.5 µA $cm^{-2}$ under 50% RH.

In the present disclosure, the experiments are carried out under various conditions designated as shown: 1) the MEA with TEOS only at the cathode catalyst layer (MEA-C); 2) the MEA with TEOS only at the anode catalyst layer (MEA-A); 3) the MEA without TEOS at both the anode and cathode catalyst layers (MEA-N); and 4) the MEA with TEOS at both the anode and cathode catalyst layers (MEA-C/A).

Figure 7:
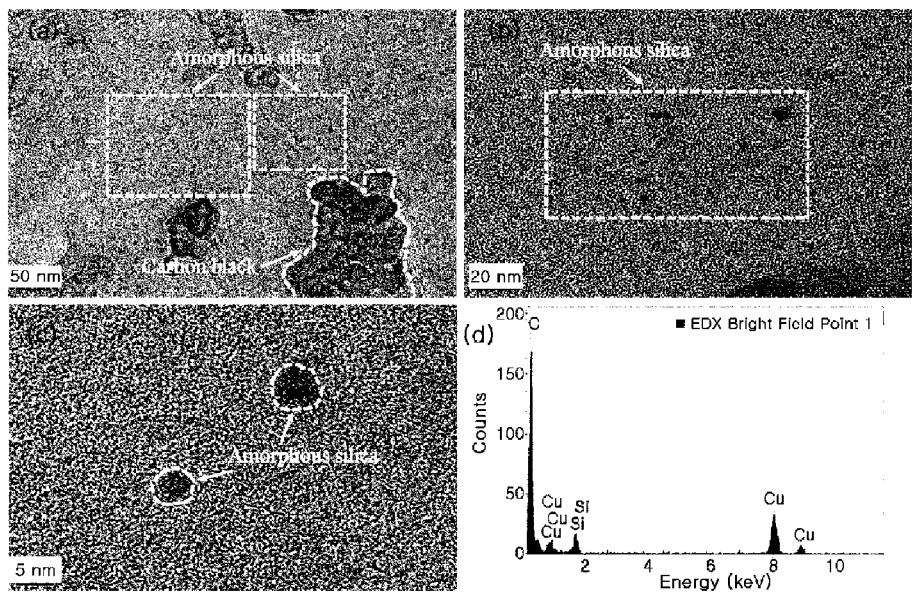
FIG. 7 shows bright field TEM images of amorphous silica particles synthesized by the in situ sol-gel reaction of tetraethoxysilane (TEOS) in a Nafion ionomer solution without Pt, and an EDS spectrum of selected amorphous silica particles.
Figure 8A:
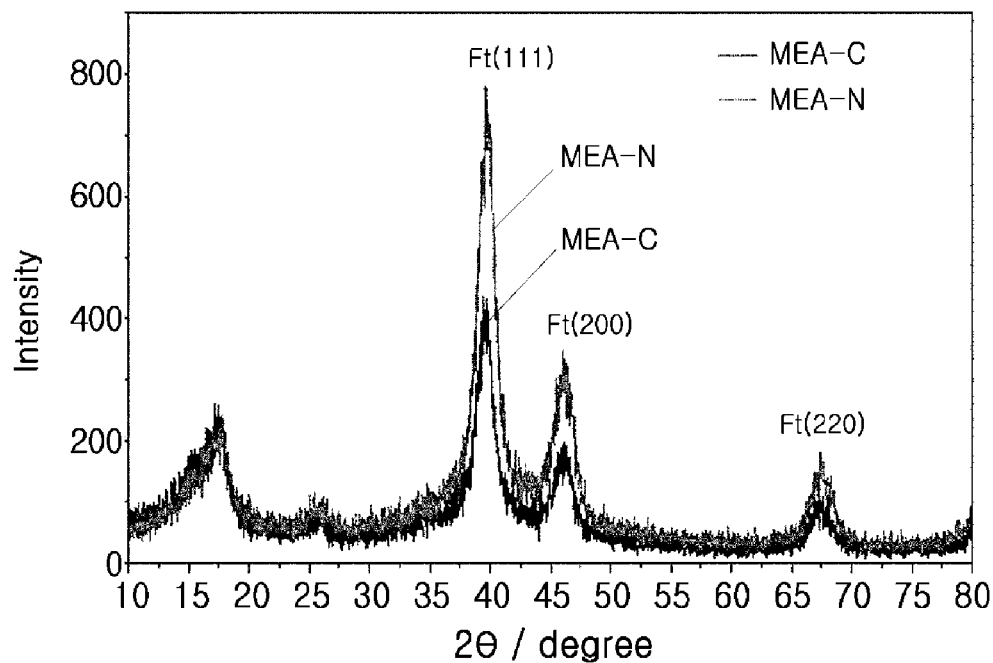
FIGS. 8a-8b show XRD patterns of MEA-C and MEA-N.
Figure 8B:
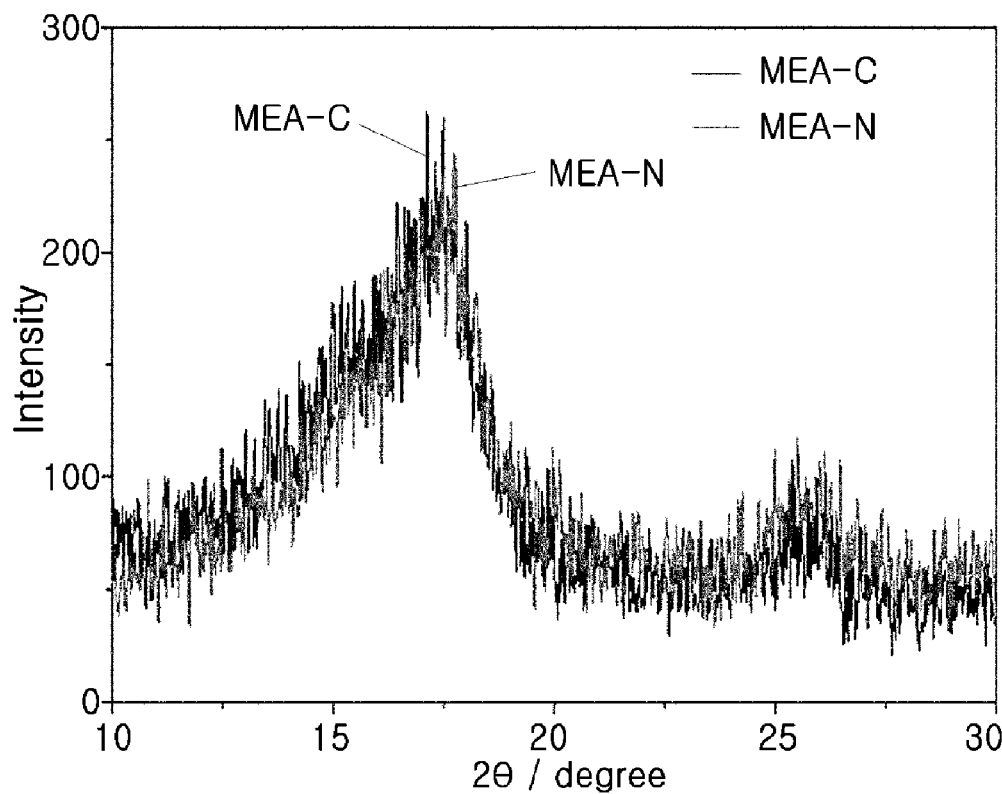
Figure 9:
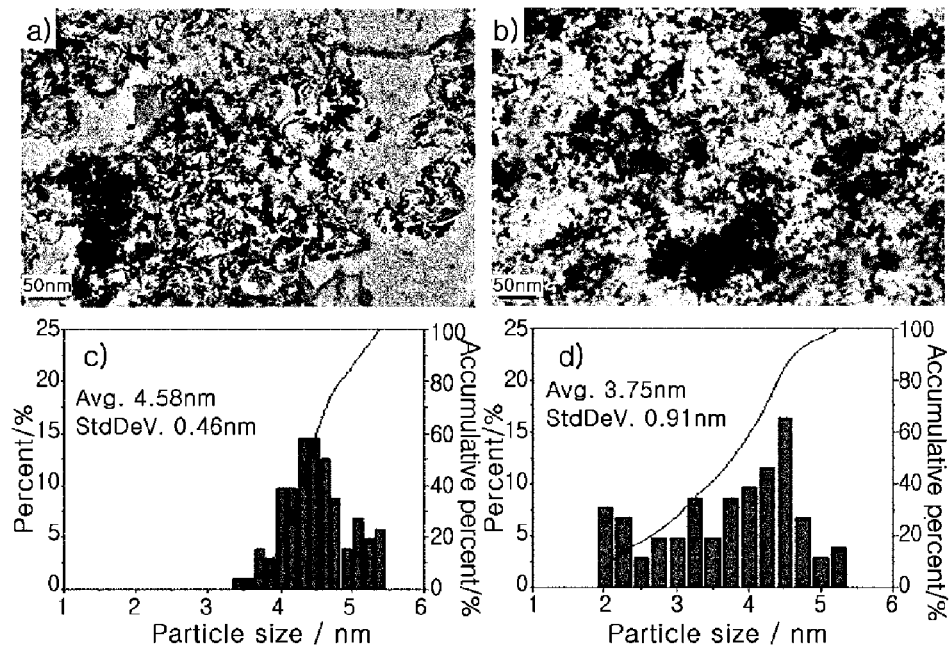
FIG. 9 shows TEM image of MEA-N, particle size distribution of MEA-N without silica nanoparticles, TEM image of MEA-C, and particle size distribution of MEA-C with silica nanoparticles.
Figure 10:
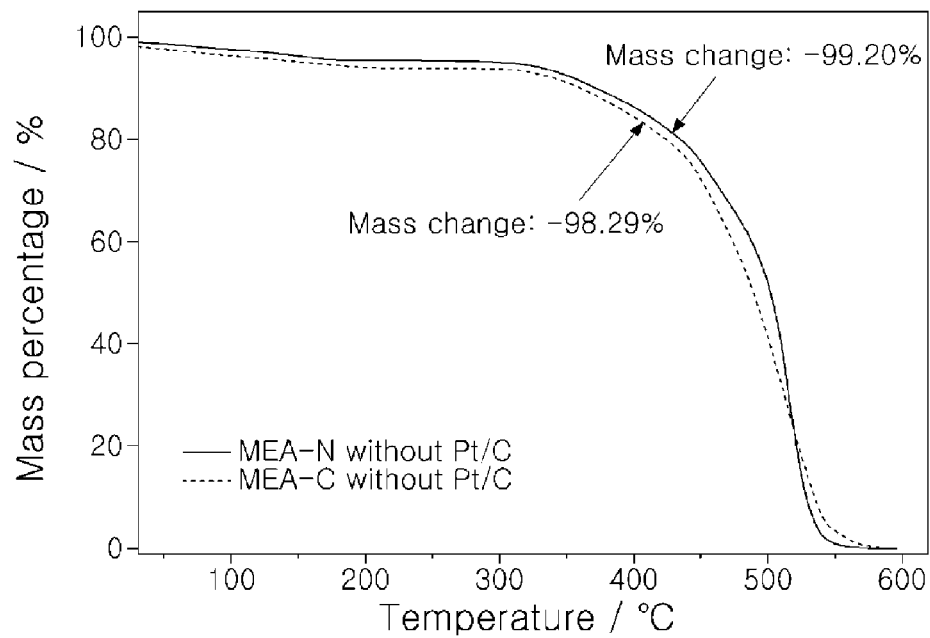
FIG. 10 shows the results of TG analysis of MEA-N without Pt/C and MEA-C without Pt/C. A heating rate of 10° C. $min^{-1}$ is used.
Figure 11A:
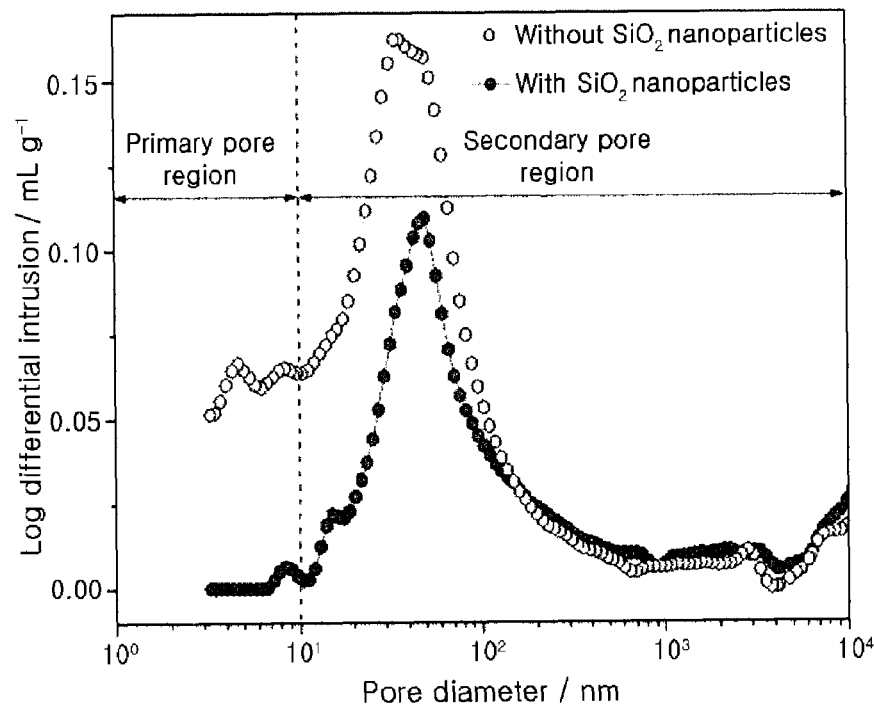
FIG. 11a-FIG. 11b show pore size distributions in membrane electrode assemblies (MEAs) with and without $SiO_2$ nanoparticles analyzed by mercury porosimetry (Autopore IV 9500, Micrometrics) (FIG. 11a), and pore size distributions in MEAs calculated from nitrogen adsorption data using the BJH method (FIG. 11b).
Figure 11B:
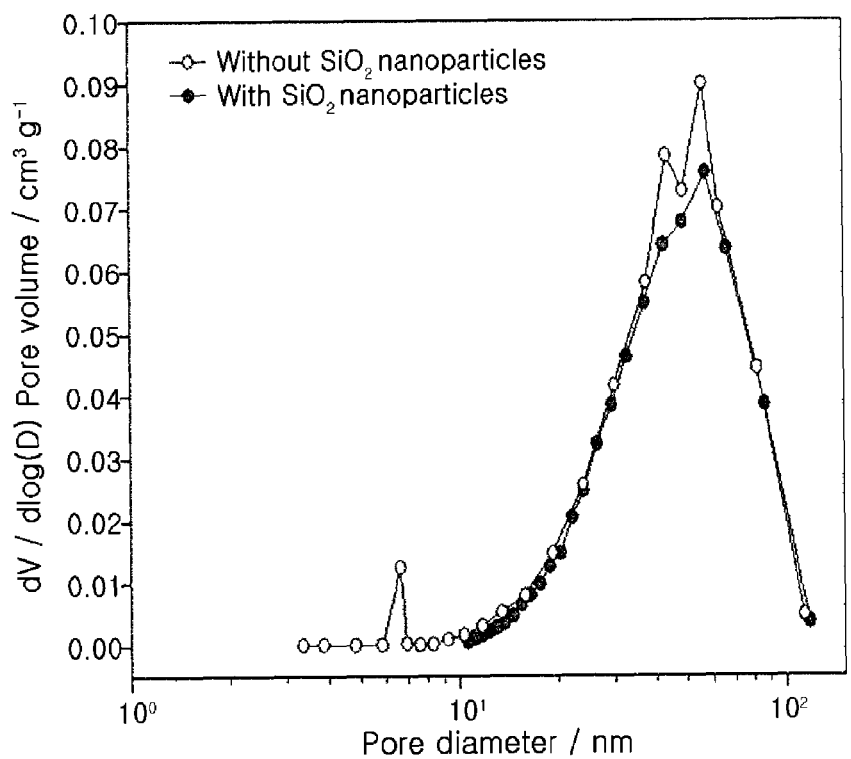

A Nafion binder solution with TEOS, which includes carbon black (Vulcan XC-72) without Pt, is sprayed onto an NRE 212 membrane to form silica nanoparticles (FIG. 7). As a result, amorphous silica particles smaller than 5 nm are observed. Additionally, the XRD results show that no peaks associated with silica are observable, which also indicates that silica exists in the amorphous state (FIG. 8). As shown in FIG. 9, TEM micrographs of MEA-N and MEA-C show that the Pt catalyst and silica are distinguished easily. However, the bimodal particle size distribution show that the amorphous silica particles, which are <4.0 nm, exist only within the catalyst layer of MEA-C. The TGA measurement indicates that the total amount of silica in the MEA-C without Pt/C is 0.9 wt %, while the percentage of the residual mass of MEA-N without Pt/C is 0.8 wt % (FIG. 10). Thus, it is difficult to find distinct silica nanoparticles everywhere in the prepared sample due to low silica content. To obtain more specific information about the two MEAs with and without $SiO_2$ nanoparticles, the pore structure is determined by using Hg porosimetry and the BJH method (FIG. 11). It is well known that the pores formed by the Pt/C catalyst layers may be classified into primary pores (i.e., pores formed between the primary carbon particles) and secondary pores (i.e., pores formed between the carbon agglomerates). Although the boundary between the two regions of the pores depends extensively on the materials that are used and the process used to prepare the catalyst layer, the porosimetry results for the two MEAs suggest that the primary pores in the MEA with $SiO_2$ nanoparticles are fewer in number than the primary pores in the MEA without $SiO_2$ nanoparticles. These results indicate that the $SiO_2$ synthesized by the in situ sol-gel reaction of TEOS exists as very small nanoparticles in the primary pores of the catalyst layer.

Figure 12:
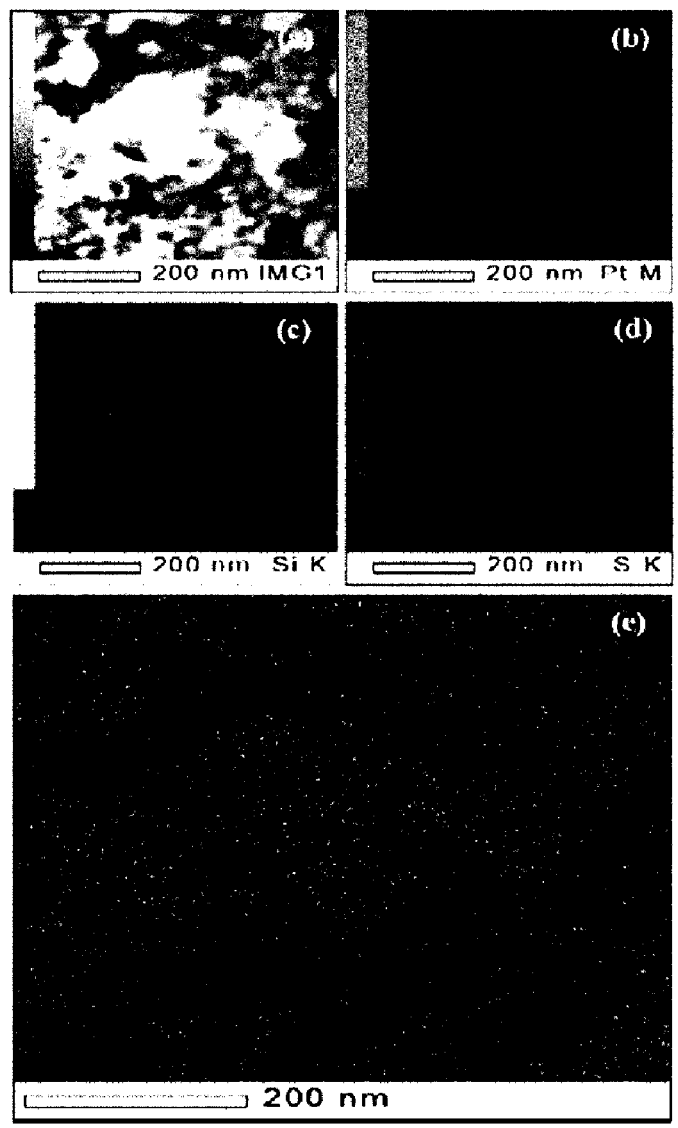
FIG. 12 shows dark-field TEM image of catalyst layer in MEA-C, and the corresponding EDS elemental mapping of the same catalyst layer region, indicating spatial distribution of (b) Pt (red), (c) Si (green) and (d) S (blue). The images are obtained on FE-TEM (JEM 2100F, JEOL) at an accelerating voltage of 200 kV.
Figure 13:
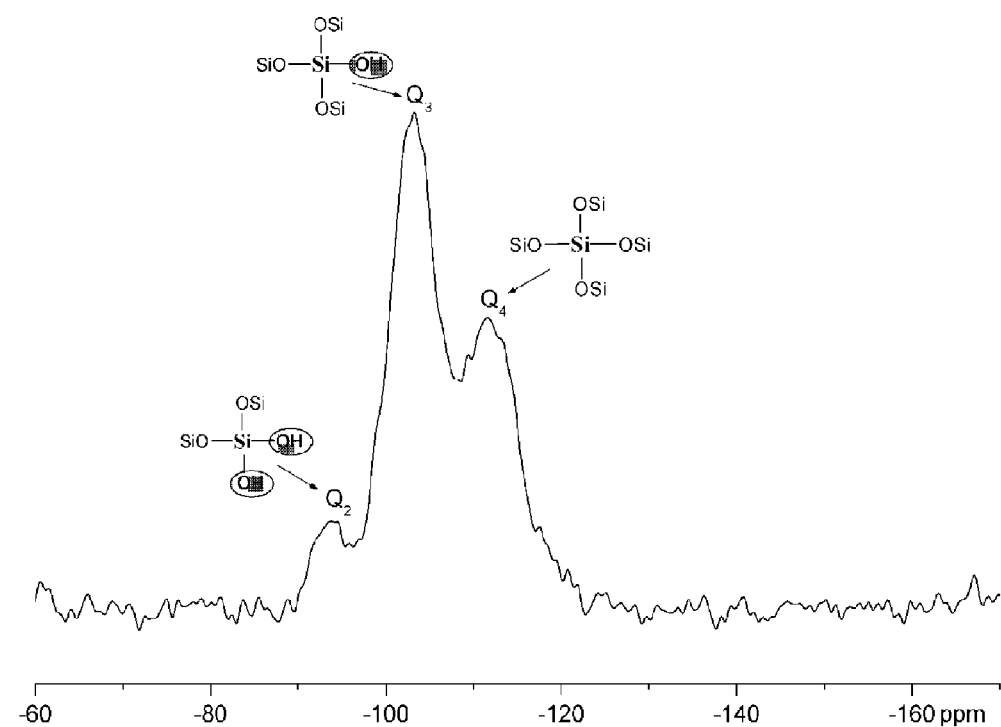
FIG. 13 shows solid-state $^{29}Si$ MAS NMR spectra of the silica nanoparticles within MEA-C (59.7 MHz, MAS rate=5 kHz):Q2:Q3:Q4=10:57:33 (−93.5, −103.2, −111.5 ppm).

Additional analyses of the catalyst layer in MEA-C using scanning TEM-EDS show that the Si is distributed uniformly in the vicinity of the graphitic carbons and the Pt catalyst layer without significant particle aggregation (FIG. 12). However, this result may be attributed to TEOS with either ethyl groups or Si—OH groups. It is generally known that the residual ethyl groups of TEOS have a negative influence on the proton conductivity. A low number of Si—OH groups decreases the amount of water adsorbed by the silica nanoparticles and the large volume occupied by the ethyl groups compared with hydroxyl groups blocks the proton channels between the sulfonate groups (—$SO_3H$) in Nafion. Thus, it is important to confirm the coordination environments of the $^{29}Si$ nuclei of the silica nanoparticles within the MEA. Solid-state $^{29}Si$ NMR is a well-established means of determining the coordination environments of $^{29}Si$ nuclei. As shown in the $^{29}Si$ spectra of FIG. 13, there is no Si resonance observed at −80 ppm in the $^{29}Si$ spectra, suggesting that there is no unreacted TEOS with ethyl groups. This indicates that full hydrolysis of TEOS is achieved in a mixture of a Nafion ionomer and a TEOS solution. Therefore, it can be said that the uniform distribution of Si in the TEM-EDS image of MEA-C is caused by the Si—OH groups instead of the ethyl groups of TEOS. Additionally, the change in the proton resistance of the catalyst layer is investigated after the addition of TEOS. A silicon atom, which is bonded to three other silicon atoms through oxygen, may be depicted as HO—Si—(O—Si)$_3$ and is generally denoted as Q3, with a chemical shift of approximately −100 ppm. Similarly, Si—(O—Si)$_4$, denoted as Q4, has a chemical shift of approximately −110 ppm. As shown in FIG. 13, the greater the Q3/Q4 ratio becomes, the greater the surface area becomes and the larger the number of surface hydroxyl groups there are. Therefore, a smaller average size of silica particles exists for the same total amount of $SiO_2$. Furthermore, higher Q3/Q4 ratios are desirable because additional surface hydroxyl groups help to retain water via hydrogen bonding.

Amorphous silica has two types of surface groups, i.e., singly Si-coordinated and doubly Si-coordinated functionalities. The estimated affinity constant for the protonation of doubly-coordinated Si₂—O⁰ is extremely low, which means that these groups may be considered as inert, as is generally accepted. It is well known that the surfaces of singly-coordinated groups (i.e., silanol groups) in aqueous environments have electric charges that are dependent on pH. In the presence of water, the silanol groups ionize, producing mobile protons that associate and dissociate from the silica surface. The equilibrium of the proton adsorption/desorption reactions for singly-coordinated surface Si groups may be written as a two-step reaction:

  (1)

  (2)

The protonation of the oxo groups on the left hand side of chemical equation 1 occurs at about $pK_{a1}=7.2$ and the association constant for chemical equation 2 is at about $pK_{a2}=1.9$. Pettersson and Rosenholm showed that the rate of the proton adsorption reaction of SiOH was increased significantly in the low pH range (<pH 3.5), resulting in a rapid increase of the ζ potential and the formation of positively-charged $SiOH_2^+$. Since the pKa value of sulfonate groups (—$SO_3H$) in Nafion is about 6, the sulfonate groups are fully dissociated at pH<2, which leads to negatively charged sulfonate groups (—$SO_3^-$) in Nafion. Thus, it can be assumed that the Nafion ionomer will self-assemble on the surface of the silica nanoparticles through electrostatic interactions under low pH conditions, which will prevent further growth of the silica nanoparticles that are initially formed.

Figure 2A:
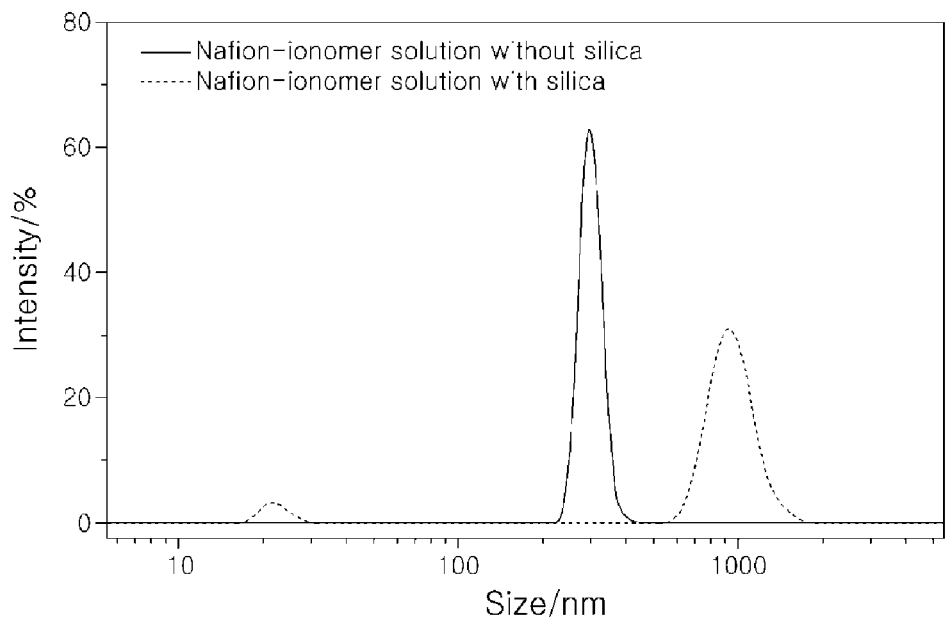
FIG. 2a-FIG. 2b show size distribution curves of a Nafion ionomer dissolved in IPA (FIG. 2a), and a schematic view of self-assembly between negatively charged Nafion ionomers and positively charged silica nanoparticles (FIG. 2b).
Figure 2B:
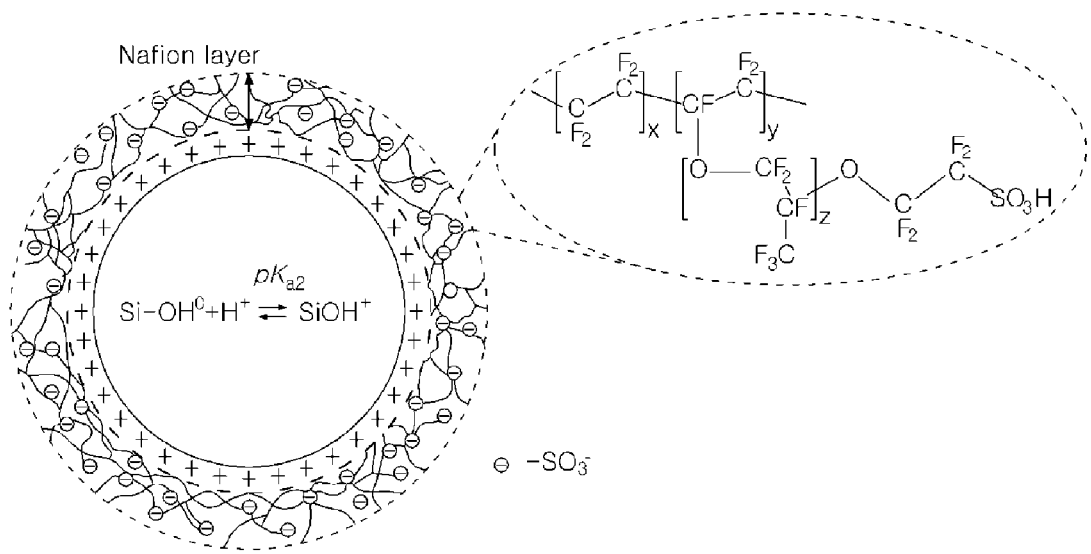
Figure 14:
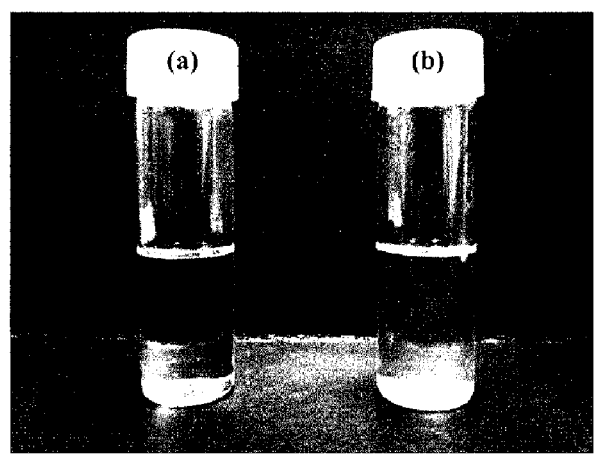

In order to offer a concrete explanation of changes in the microstructure of the Nafion ionomer with in situ-formed silica nanoparticles, a specific Nafion solution is prepared under low pH conditions as follows: the Nafion DE 521 solution (5 wt %, DuPont) and TEOS solution in isopropyl alcohol (IPA)/DI water is dispersed to form a mixture and to facilitate the hydrolysis of TEOS, whereby the mixture is sprayed directly onto each side of a Nafion NRE 212 membrane at 80° C. Subsequently, the Nafion membrane with the silica nanoparticles is dissolved in IPA for 140 h at 25° C. to form 1 wt % solutions. After the solutions are adjusted to pH 1.90±0.02 with 0.5 M HCl, the solutions are continuously stirred for 15 h. The Nafion solution with the silica nanoparticles is more opaque than the Nafion solution without silica (FIG. 14). The ζ potential of the Nafion ionomer solution without silica in IPA is about 26.8±0.8 mV, whereas the ζ potential of the Nafion ionomer solution with silica is about 33.4±0.9 mV. The ζ potential of the Nafion ionomer solution with silica is greater than that without silica. Furthermore, it can be seen from the results of dynamic light scattering (DLS) measurements as shown in FIG. 2a that the Nafion ionomer solution with silica has larger particles, i.e., a hydrodynamic diameter of 930 nm, as compared to the Nafion ionomer solution without silica. As the negatively charged sulfonate groups (—$SO_3^-$) in Nafion assemble on the positively charged $SiOH_2^+$ groups, due to electrostatic attraction (FIG. 2b), the concentration of Nafion in the vicinity of $SiO_2$ increases and the dangling chains in Nafion become incorporated into other Nafion ionomers via hydrophobic interactions with the Nafion backbone, leading to a greater negative charge than that of the individual Nafion ionomer. This is consistent with the results presented by Zhang et al. In addition to the Nafion ionomer with a hydrodynamic diameter of 930 nm, the agglomeration of the inorganic particles in the solvent is also detected at about 20 nm.

From the results of the ζ potential and the DLS measurements, it can be concluded that the size of the Nafion ionomer assembled on $SiOH_2^+$ increases due to the electrostatic attraction between negatively charged—$SO_3^-$ groups and positively charged $SiOH_2^+$ groups at about pH 1.90. As can be seen from the foregoing, self-assembly is one of the crucial aspects in the performance of PEFCs. It can be said that the self-assembly process between positively charged $SiOH_2^+$ groups and negatively charged —$SO_3^-$ groups in Nafion helps to counteract the effect of the specific adsorption of —$SO_3^-$ groups on Pt—O, which enhances the ORR in the catalyst layer of the cathode (i.e., both the anode and cathode of the PEFC operate at very low pH<1).

Figure 3A:
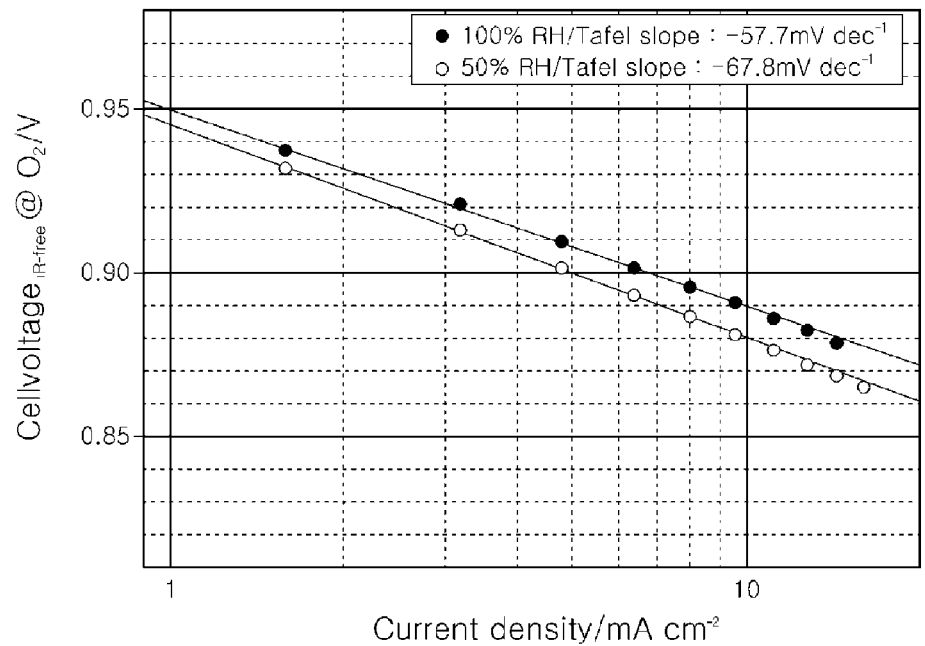
FIG. 3a-FIG. 3b show Tafel slopes taken from corrected polarization curve data of MEA-N (MEA having no silica in the electrode layer) (FIG. 3a) and MEA-C (MEA having silica only within a cathode layer) (FIG. 3b). Data are corrected by measured ohmic losses and crossover.
Figure 3B:
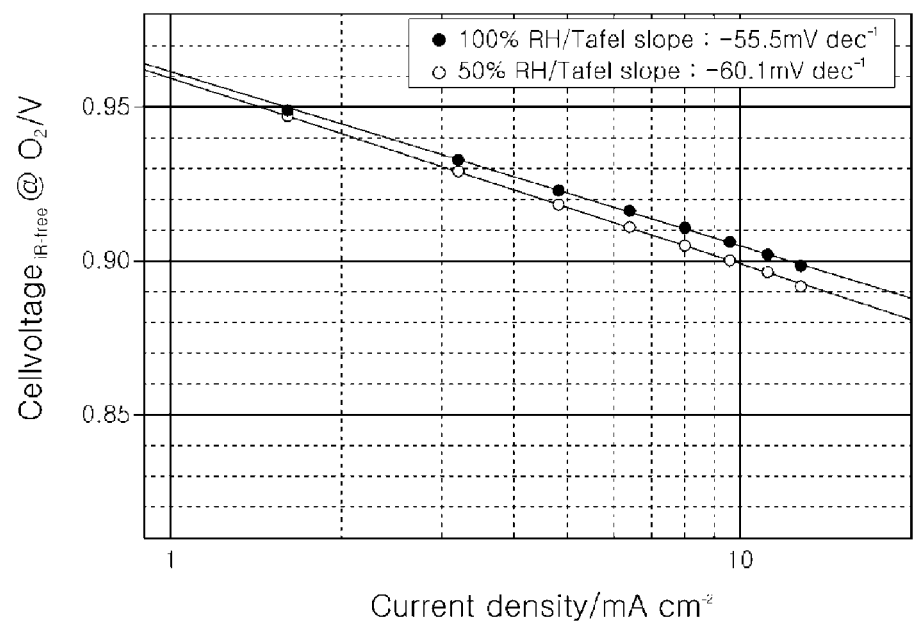
Figure 4:
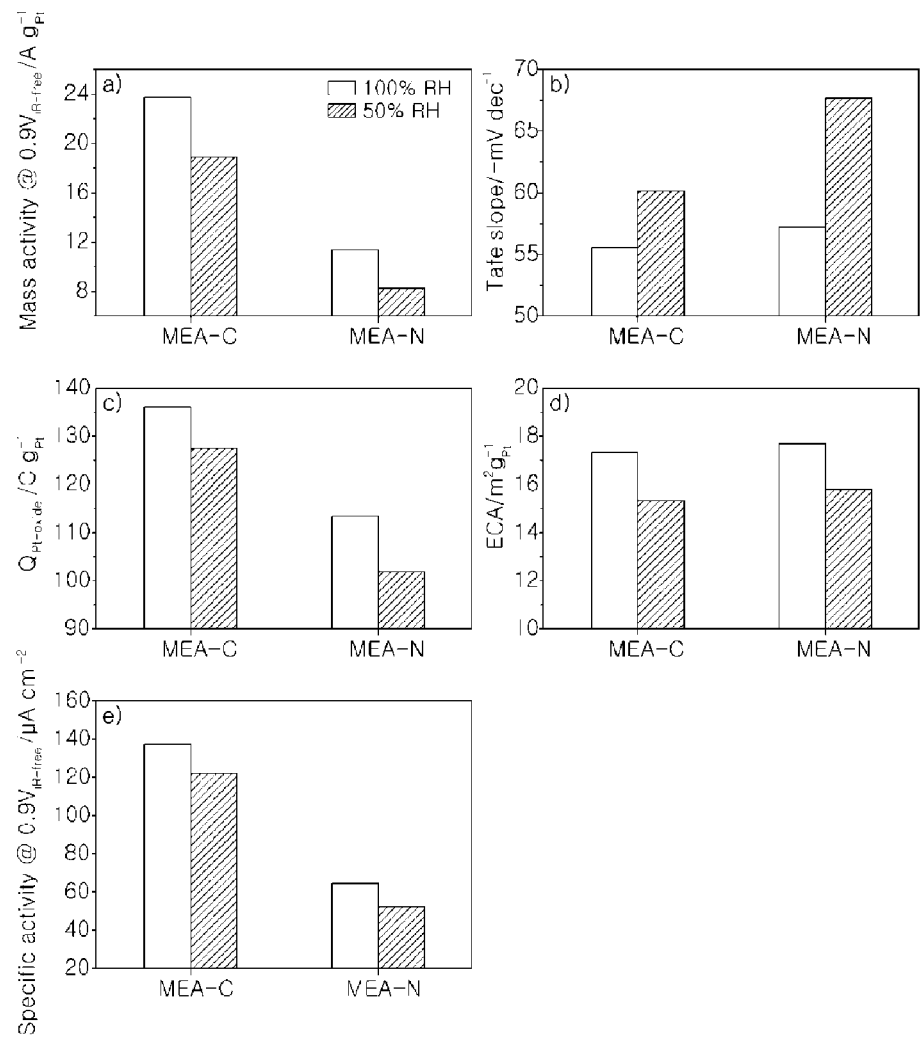
FIG. 4 shows mass activity values of MEA-N and MEA-C; Tafel slopes of MEA-N and MEA-C; Pt oxide formation charge ($Q_{Pt-oxide}$) values of MEA-N and MEA-C; electrochemical surface area (ECA) of MEA-N and MEA-C; specific activity values of MEA-N and MEA-C. In order to calculate the specific activity, the ECA values are measured at 70° C.

Wood et al. (2009) demonstrated the morphological rearrangement between the hydrophobic backbone and hydrophilic side chains in Nafion at the interface between Nafion and Pt using neutron reflectometry. They revealed that more —$SO_3^-$ groups are present in the region of Pt—O and that the hydrophobic portion of Nafion is pushed away from the oxide interface during the ORR. However, the highly-aggregated —$SO_3H$ groups may suppress the ORR kinetics occurring on the surface of the Pt due to the specific adsorption of —$SO_3H$ groups on Pt. In particular, the decrease in the number of water molecules per —$SO_3H$ group increases the concentration of—$SO_3H$ at the interface between the Pt and the ionomer, which results in a large decrease in mass activity (MA) at low RH. However, the self-assembly process between positively charged $SiOH_2^+$ groups and negatively charged —$SO_3^-$ groups in Nafion may reduce the specific adsorption of —$SO_3H$ groups on the surface of Pt—O, thereby enhancing the ORR kinetics in the cathode catalyst layer at low RH. As can be seen from FIG. 3 and FIG. 4a, the MA values of MEA-C and MEA-N at 100% RH and 0.9 $V_{iR-free}$ are 23.8 and 11.4 A $g_{Pt}^{-1}$, respectively. The Tafel slopes of MEA-C and MEA-N are −55.5 and −57.7 mV dec⁻¹, respectively. (The MA and the Tafel slope are calculated from the iR-corrected I-V curve under $O_2$ conditions and ambient pressure. The proton resistance in the ionomer binder of the catalyst layer is not corrected. At each current, there is an 18 min wait for the cell to stabilize and then the voltage of the cell is measured. The MA is defined as the current at 0.9 $V_{iR-free}$ per unit Pt mass). FIG. 3 and FIG. 4a also show that the MA values of MEA-C and MEA-N at 50% RH are 18.9 and 8.3 $Ag_{Pt}^{-1}$, respectively. The Tafel slopes of MEA-C and MEA-N at 50% RH are 60.1 and 67.7 mV dec⁻¹, respectively.

Figure 5:
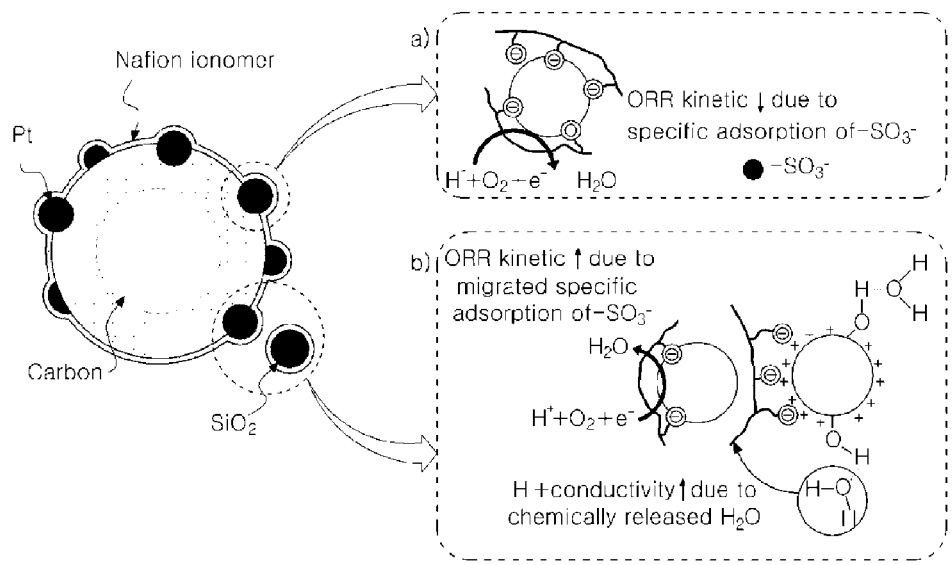
FIG. 5 shows schematic depiction of specific adsorption of the sulfonate groups (—$SO_3^-$) on Pt; and mitigation of specific adsorption by the sulfonate groups (—$SO_3^-$) on Pt due to the self-assembly between positively charged silica particles and the negatively charged sulfonate groups.

As shown in FIGS. 3 and 4b, there are no significant differences between the Tafel slopes of MEA-C and MEA-N at 100% RH. However, the value of the Tafel slope for MEA-N at 50% RH is greater than that of MEA-C, which means that the specific adsorption on Pt inhibits the ORR kinetics and protons are in insufficient supply for utilization by the Pt catalyst in the region of low current under low RH conditions (FIG. 5). More particularly, this indicates that the specific adsorption of —$SO_3^-$ groups on Pt in MEA-C is mitigated due to the self-assembly and there is no significant problem related to proton transport in the ionomer binder of the catalyst layer with silica nanoparticles because of the water molecules adsorbed on the silica nanoparticles under low RH conditions. These explanations are examined in more detail by analyzing the water content in the polymer membrane as well as the proton resistance in the catalyst layer and the results are presented below. In general, it has been reported that the MA has a significant dependence on the specific adsorption as compared to the Tafel slope and the electrochemical surface area (ECA). In this study, there is a very distinct difference between the MA of MEA-C and MEA-N at 50 and 100% RH as compared to the Tafel slopes. It is evident that the MA of MEA-C is twice as large as the MA of MEA-N under different RH conditions. Under high RH conditions, the difference in the MA between MEA-C and MEA-N means that the self-assembly process between positively charged $SiOH_2^+$ groups and negatively charged $—SO_3^-$ groups in Nafion helps to counteract the specific adsorption of $—SO_3^-$ groups on Pt. Under low RH conditions, the higher value of the MA of MEA-C also indicates that $H_2O$ molecules generated by the ORR on the Pt electrode can be adsorbed directly by the silanol groups, which may increase the number of water molecules per $—SO_3H$ group and mitigate a specific adsorption by the $—SO_3^-$ groups on the Pt catalysts.

If there were a sufficient number of water molecules at the interface between the $—SO_3H$ groups and the Pt surface for the surface oxidation of Pt, the water molecules would increase the MA as well as Pt oxide formation at low RH. At a higher potential (more than 0.7 V) versus the reversible hydrogen electrode (RHE), the electrochemical chemisorption of oxygen and Pt oxidation are initiated with the following reactions:

$$Pt+H_2O \rightarrow Pt—OH_{ad}+H^++e^- \quad (3)$$

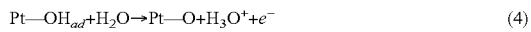
$$Pt—OH_{ad}+H_2O \rightarrow Pt—O+H_3O^++e^- \quad (4)$$

From the cyclic voltammetry (CV) positive potential scans, the Pt oxide formation charge ($Q_{Pt\text{-}oxide}$) is obtained at different RH conditions. As shown in FIG. 4c, the $Q_{Pt\text{-}oxide}$ of MEA-C is much higher than that of MEA-N under 100 and 50% RH. Since $H_2O$ molecules are related directly to chemical equations 3 and 4, a low concentration of $H_2O$ on the surface of Pt may lead to the suppression of $Q_{pt\text{-}oxide}$ at low RH conditions. The presence of silica nanoparticles in the vicinity of Pt nanoparticles may increase the water concentration on the surface of Pt, thereby enhancing the formation of Pt oxide at low RH.

Cyclic voltammetry (CV) is conducted in order to measure the electrochemical surface area (ECA) of Pt at 70° C. As a result, the ECA of MEA-C decreases from 17.3 $m^2$ $g_{Pt}^{-1}$ at 100% RH to 15.4 $m^2$ $g_{Pt}^{-1}$ at 50% RH (FIG. 4d). In the case of MEA-N, the ECA decreases from 17.7 $m^2$ $g_{Pt}^{-1}$ at 100% RH to 15.8 $m^2$ $g_{Pt}^{-1}$ at 50% RH. It is well known that the ECA for hydrogen adsorption/desorption in the CV profile depends on the size of the Pt particles, the binder structure, the cell temperature, the technique used to prepare the electrode and the flow rate of the reactant during the CV measurement. The theoretical ECA of the Pt nanoparticles used herein is 65.5 $m^2$ $g_{Pt}^{-1}$. The diameter of the Pt nanoparticles calculated from the TEM images is 4.58±0.46 nm (FIG. 9a). The diameters of the Pt nanoparticles are unchanged when the TEOS solution is added. Hydrolyzed alkoxysilanes may migrate to the negatively charged sulfonate groups ($—SO_3^-$) due to the rapid increase in the zeta potential (ζ) at pH<2, thereby forming a core-shell structure. As a result, the Nafion ionomer with a core-shell structure cannot penetrate deeply into the primary pores of the electrode and the utilization of Pt is unaffected. As shown in FIG. 11, the significant reduction of the primary pores in the electrode is attributed to the silica nanoparticles. Considering the ECA values of MEA-N and MEA-C, the specific activity of Pt is calculated. As a consequence, the specific activity of Pt in MEA-C is found to be much greater than that of MEA-N (FIG. 4e).

Polarization experiments are conducted in a galvanostatic mode. An electronic load is used to maintain a constant current. At each current, the cell is allowed to stabilize for 18 min, after which the voltage of the cell is measured. Four significant observations can be made from FIG. 6. 1) The high frequency resistance (HFR) of MEA-C is lower than those of other types of MEA due to proton transport in the polymer membrane. 2) The performance of the MEA-C cell at 50% RH does not decrease significantly in comparison to that at 100% RH, i.e., the current densities of MEA-C and MEA-N at 50% RH and 0.6 V are 655 mA $cm^{-2}$ and 476 mA $cm^{-2}$, respectively. 3) The cell performance of MEA-N and MEA-C/A are similar at 50% RH. 4) There is a detrimental effect on the cell performances of MEA-C/A and MEA-A at 50% RH. These results indicate that the novel composite catalyst layer has a remarkable ability to retain water and that the chemically adsorbed water in $SiO_2$ may be released into the electrode and polymer membrane. In general, the water transport inside the polymer membrane is determined mainly by the electro-osmotic drag (i.e., the dragging of water molecules from the anode to the cathode by the current-carrier protons), back-diffusion (i.e., the transfer of water into the membrane due to the concentration gradient of the water from the cathode to the anode) and convection (i.e., water movement that occurs due to pressure gradients between the cathode and the anode). However, the convection effect is generally negligible as compared to the effects of electro-osmotic drag and back diffusion because there is no pressure difference between the anode and the cathode. Thus, electro-osmotic drag and back diffusion dominate the water transport inside the polymer membrane of a PEFC.

Figure 6A:
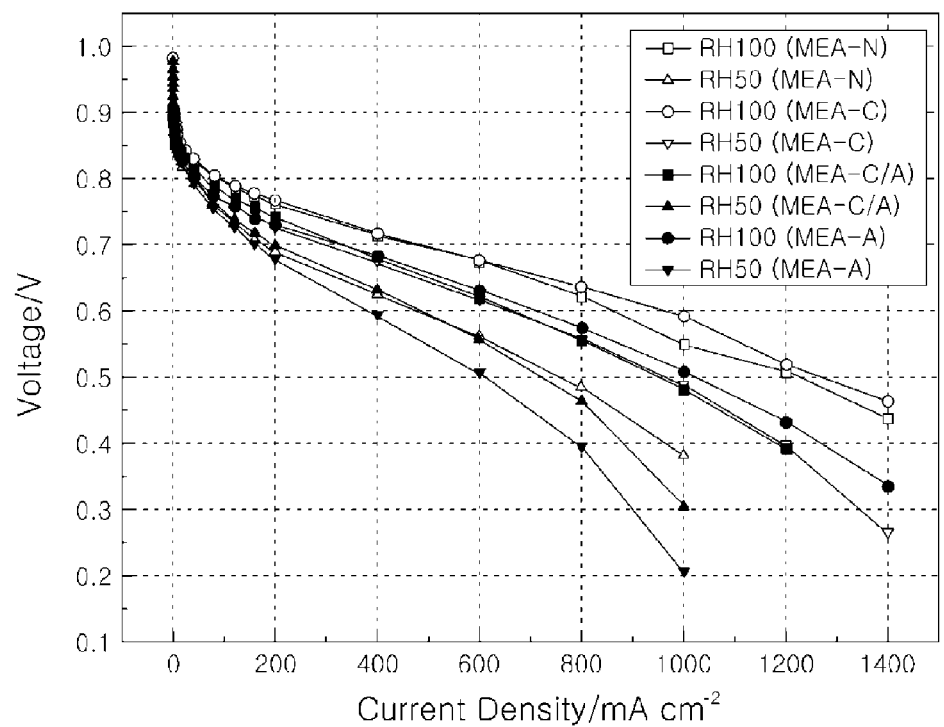
FIG. 6a-FIG. 6f show electrochemical characteristics of MEAs.
Figure 6B:
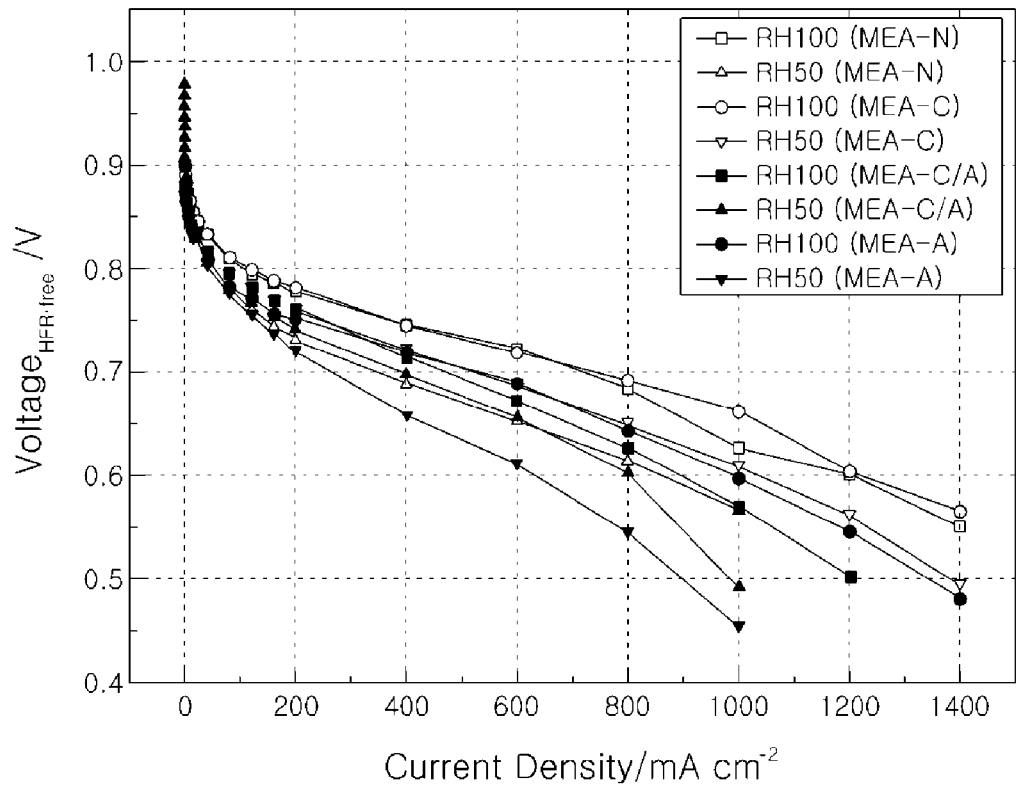
Figure 6C:
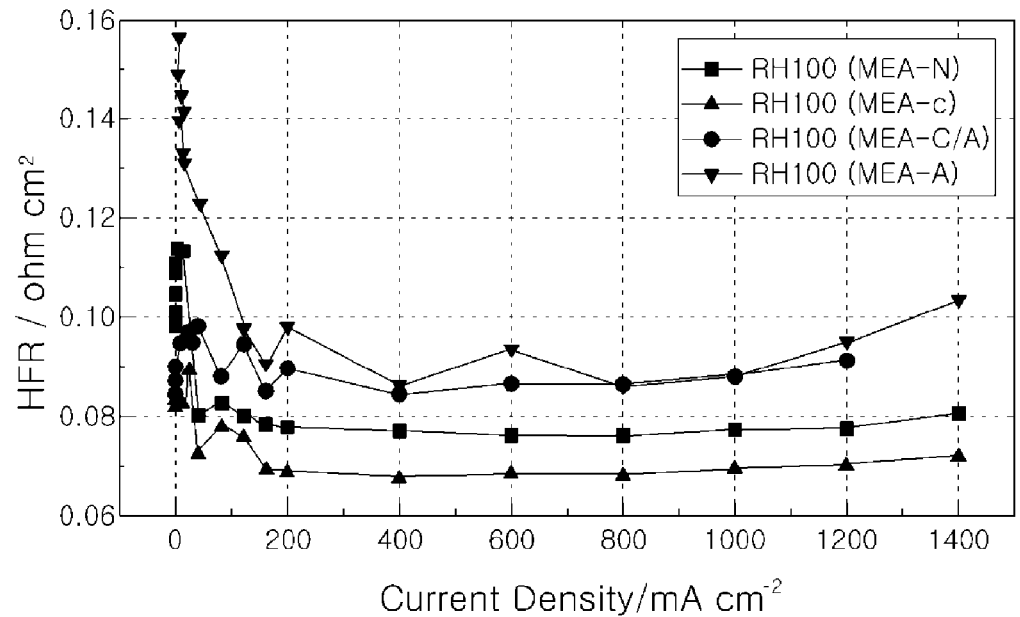
Figure 6D:
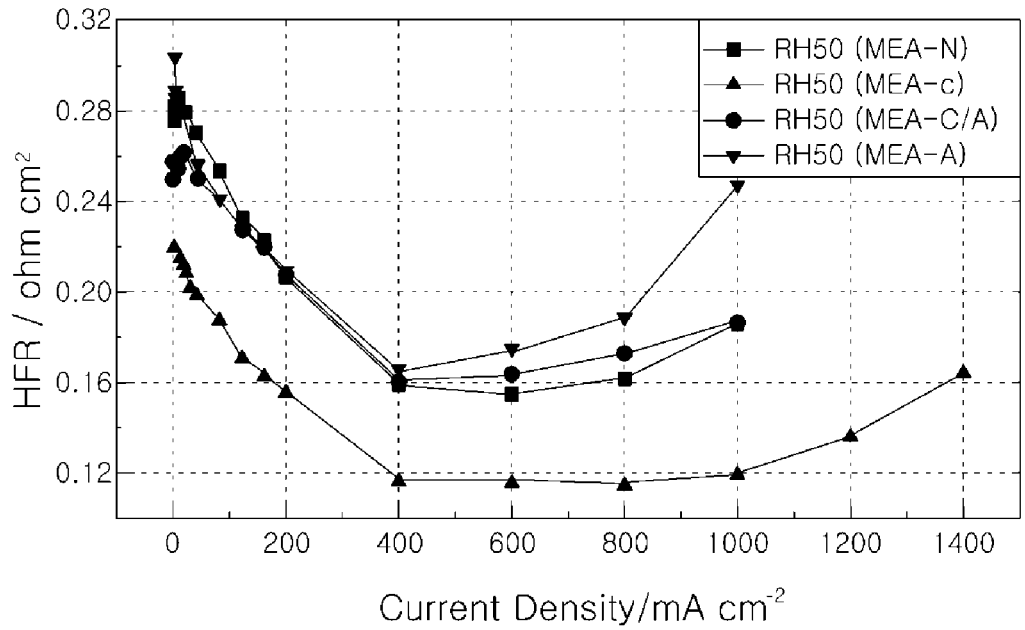
Figure 6E:
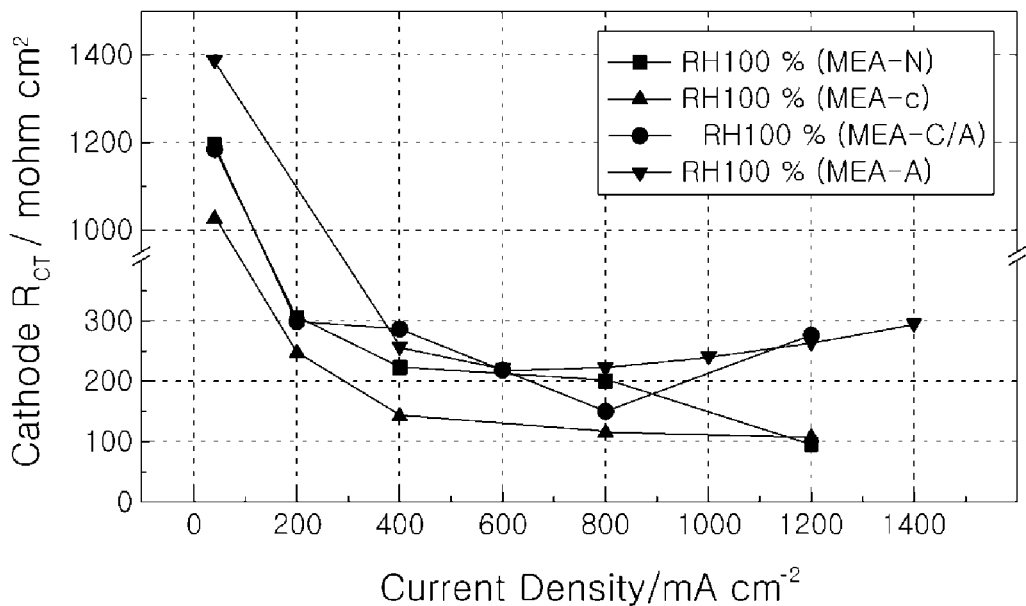
Figure 6F:
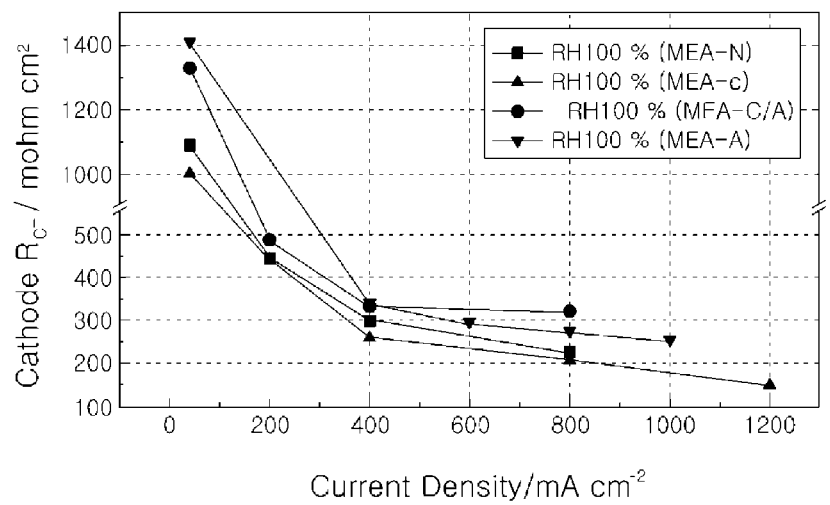
Figure 15:
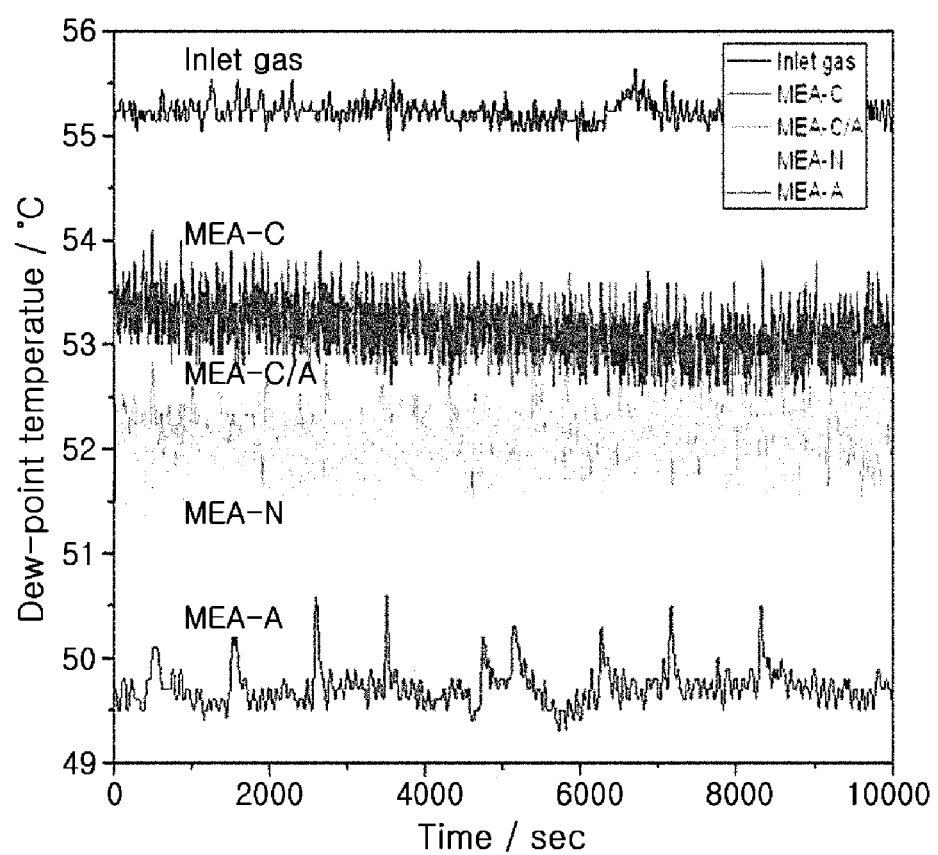
FIG. 15 shows dew-point temperatures of the exhaust gas at the anode as a function of time. The cell temperature is set to 70° C. Humidified $H_2$ gas of 50% RH is supplied to the anode at a flow rate of 100 mL $min^{-1}$ and humidified air of 50% RH is supplied to the cathode at a flow rate of 410 mL $min^{-1}$ with a constant current density of 400 mA $cm^{-2}$ under ambient pressure.

As shown in FIG. 6c and FIG. 6d, MEA-C has a lower HFR value as compared to the other MEAs. Furthermore, the HFR values of MEA-C are much lower than the others at 50% RH. This may be attributed to the enhanced back diffusion. When the catalyst layers of the anode and the cathode are dehydrated under conditions of low humidity, the catalyst layer of the cathode is more easily dehydrated than the catalyst layer of the anode due to excessive water loss caused by the high stoichiometric air flow. This phenomenon has a detrimental effect on back diffusion in the PEFC due to the low concentration of water in the catalyst layer of the cathode. Thus, if the back diffusion of water from the cathode to the anode through the polymer membrane is sufficient to maintain an adequate water content in the polymer membrane and the binder, the performance of the cell may be increased significantly due to sufficient water transport from the cathode to the anode. Consequently, it is important to maintain a high concentration of water in the catalyst layer of the cathode under conditions of low humidity. When the electrode is dehydrated, the chemically adsorbed water in $SiO_2$ is released into the electrode, which increases the concentration of water at the cathode as compared to the anode. A higher concentration of water at the cathode enhances back diffusion via the polymer membrane and then the advantage of water transport from the cathode side to the anode side offers excellent proton conductivity to the polymer membrane under dehydration conditions. However, when the anode has $SiO_2$ nanoparticles, the amount of water transported by back diffusion decreases due to the small difference between the concentrations of water at the cathode and the anode. As shown in FIG. 6c and FIG. 6d, the HFR values of MEA-A and MEA-C/A at 50% and 100% RH are greater than the other HFR values. In order to compare the water transport via the polymer membrane according to the different types of MEA, a humidity sensor (Viasensor HS-1000) is connected to the outlet of the anode to measure the vapor pressure of the water at a constant current density of 400 mA $cm^{-2}$ at 50% RH. As shown in FIG. 15, the dew point of the anode exhaust gas in MEA-C is greater than the dew points of the exhaust gases from the other MEAs. Specifically, the dew points of MEA-C, MEAA, MEA-C/A and MEA-N are 53.6±0.3, 49.7±0.2, 52.2±0.2, and 52.2±0.4° C., respectively. The dew points are in the following increasing order: MEA-A<MEA-N<MEA-C/A<MEA-C. The dew point of the inlet gas at the anode is 55.2±0.1° C.

Considering the dew points obtained experimentally, the water transport caused by electro-osmotic drag is greater than that caused by back diffusion. However, these results are based on the assumption that water transport from the cathode side to the anode side is enhanced by the addition of a TEOS solution to only the catalyst layer of the cathode as it enhances back diffusion. As mentioned earlier, a further increase in the concentration of water in the catalyst layer at the anode may be responsible for the decrease in the difference between the concentrations of water in the catalyst layers of the anode and cathode, resulting in reduced water transport from the cathode to the anode and severe water flooding at the catalyst layer of the cathode under conditions of high RH. This indicates that the addition of TEOS to the catalyst layer of the anode is inadequate for providing higher cell performance at conditions of high RH.

Figure 16:
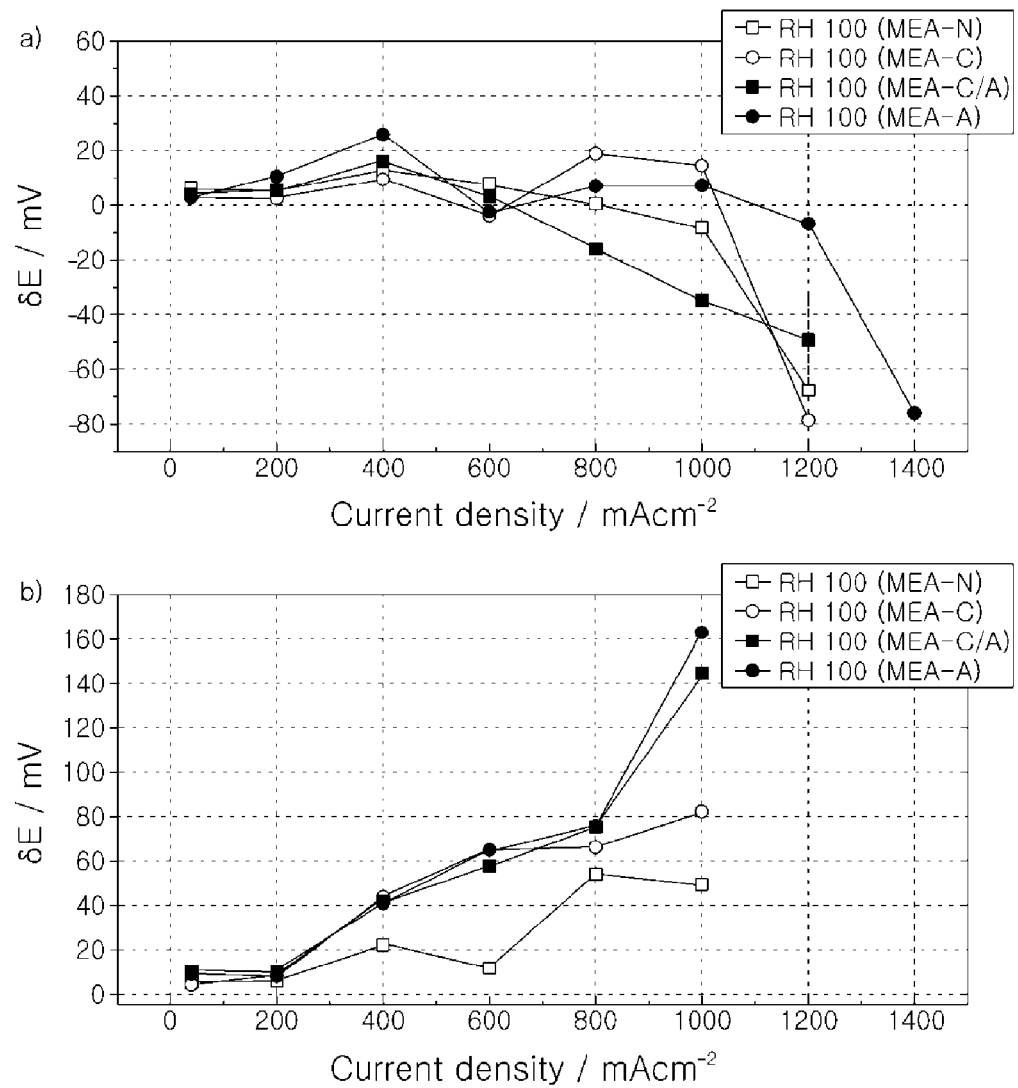
FIG. 16 shows a graph illustrating cell potential differences (δE) from the initial time to 280 seconds as a function of current density at 100% RH, and a graph illustrating cell potential differences (δE) from the initial time to 280 seconds as a function of current density at 50% RH.
Figure 17A:
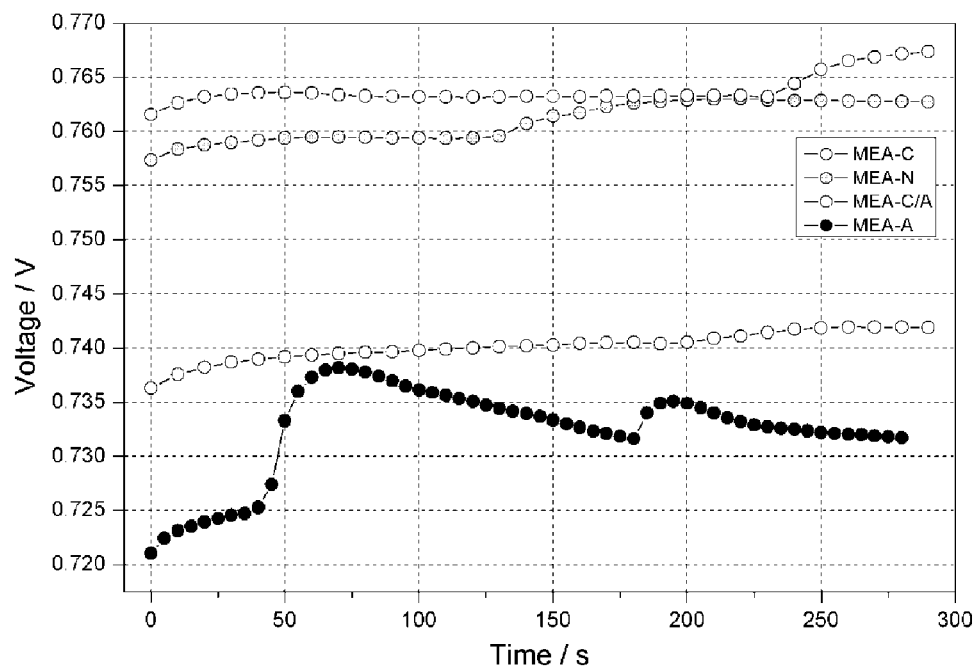
FIG. 17a-FIG. 17e show graphs illustrating variations in voltage as a function of time under the conditions of: current density 200 mA $cm^{-2}$, 100% RH (FIG. 17a); current density 600 mA $cm^{-2}$, 100% RH (FIG. 17b); current density 1000 mA cm$^{-2}$, 100% RH (FIG. 17c); current density 200 mA cm$^{-2}$, 50% RH (FIG. 17d); current density 600 mA cm$^{-2}$, 50% RH (FIG. 17e); and current density 1000 mA cm$^{-2}$, 50% RH.
Figure 17B:
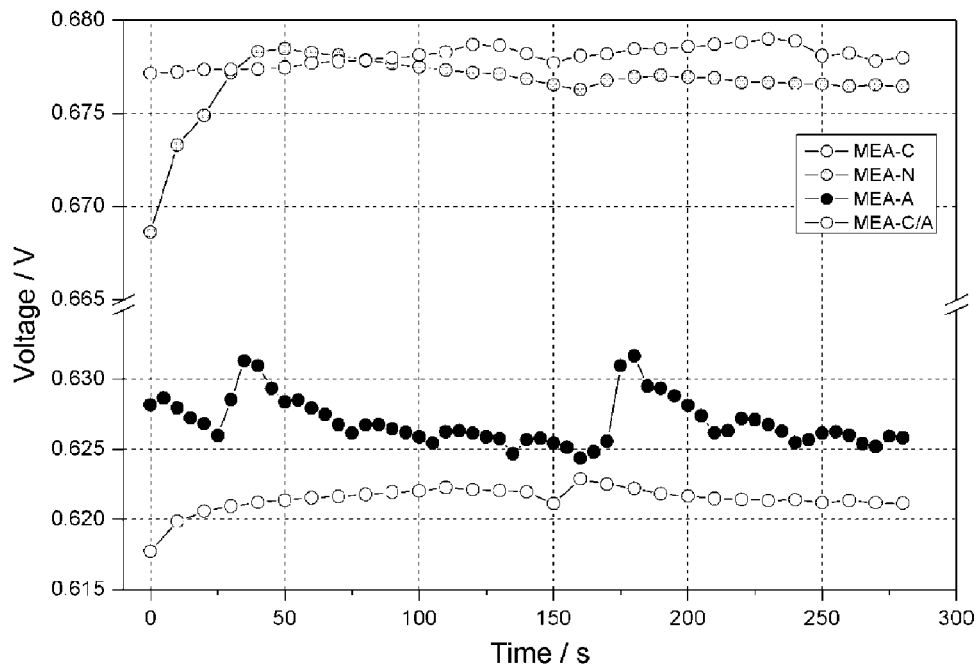
Figure 17C:
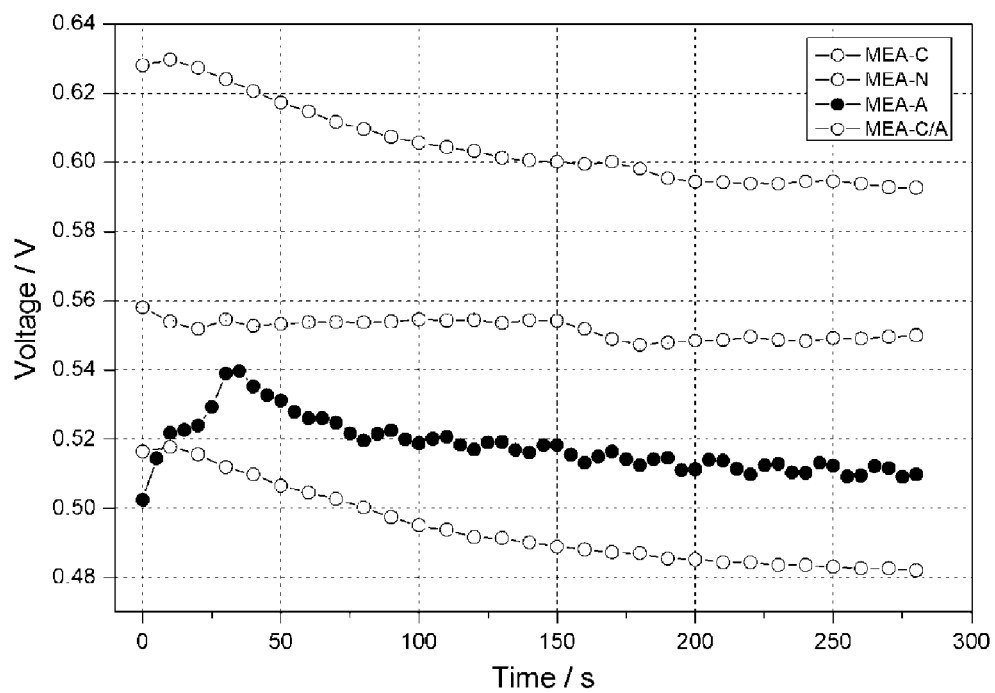
Figure 17D:
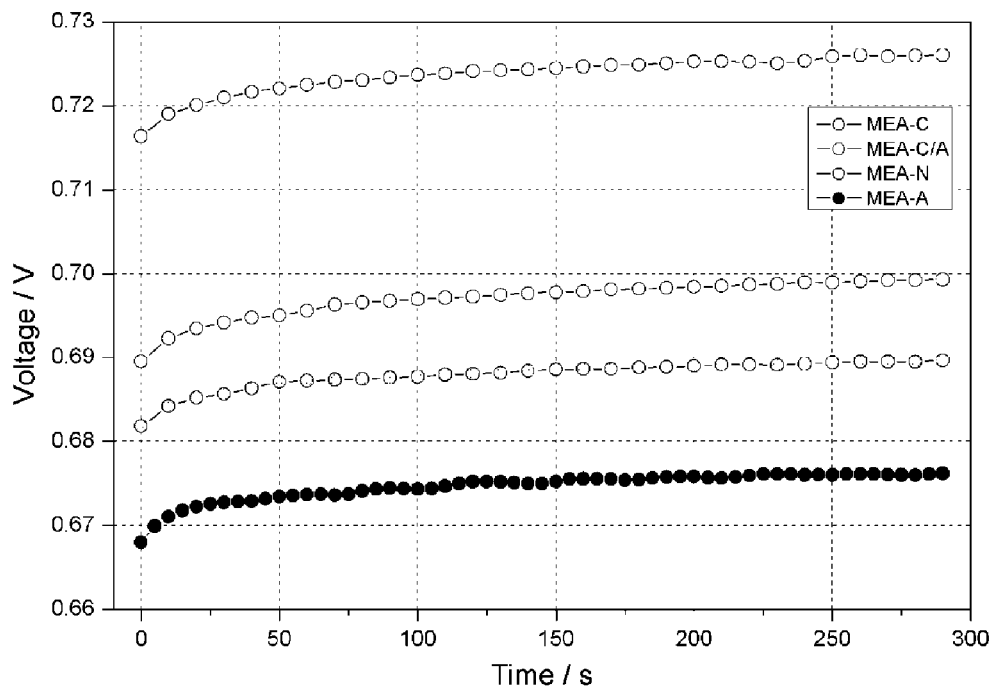
Figure 17E:
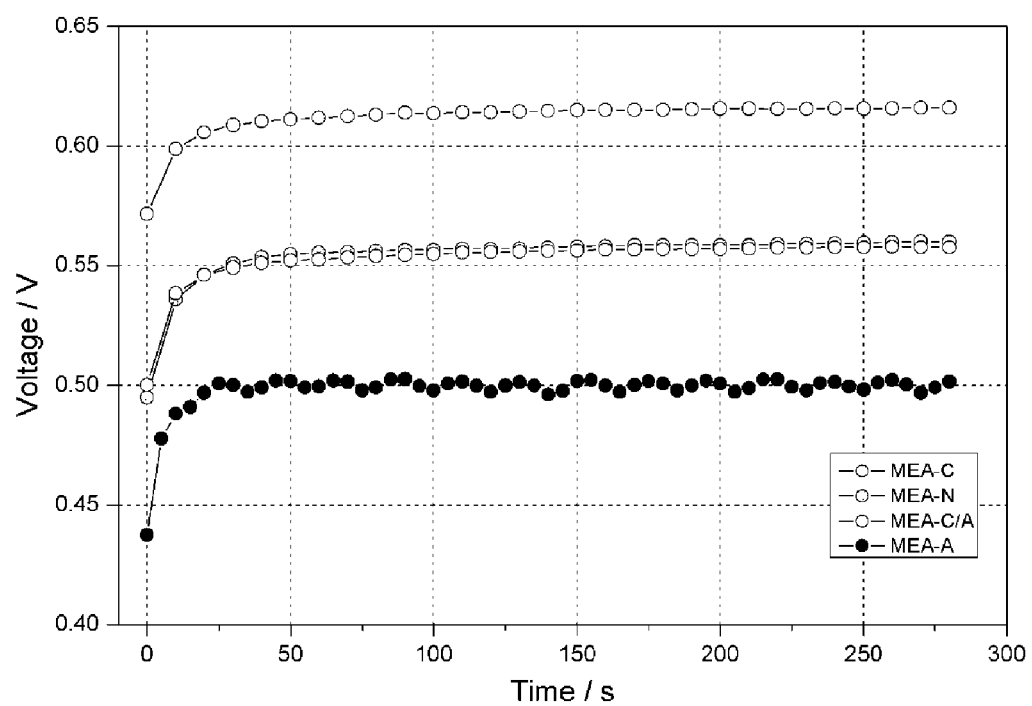

FIG. 16 shows the differences in the cell potential ($\delta E$) between an initial time and 280 s as a function of the current density. For MEA-A at 50% RH, the $\delta E$ increases slightly with increasing current densities less than 600 mA cm$^{-2}$, but it increases more rapidly at current densities greater than 800 mA cm$^{-2}$ as compared to the others. FIG. 17 also shows the variation of voltage as a function of time for various RH conditions and various current density conditions. As shown in FIG. 17d-FIG. 17f, the performance of MEA-A is strongly dependent on the applied current density and operation time at 50% RH. As the current density increases, the voltage increases between the initial time and 25 s for MEA-A, which is greater than the others at 50% RH. This may be attributed to the change in the water transport through the polymer membrane. (See FIG. 18). For MEA-A at 50% RH, the concentration of water at the catalyst layer of the anode ($CL_a$) is greater than that at the catalyst layer of the cathode ($CL_c$) due to the high flow rate on the cathode side and the chemically adsorbed water in the SiO$_2$. Thus, the water molecules are transported from the anode side to the cathode side through the polymer membrane via to back diffusion caused by the difference in the concentration of water. When the cell operates at constant current density, the water molecules are also transported from the anode side to the cathode side due to electro-osmotic drag. Under this condition, the water content of the polymer membrane decreases significantly in the vicinity of the catalyst layer on the anode, resulting in a higher overpotential due to the increase in the resistance to proton transfer in the polymer membrane. However, at the same time, the concentration of water at the $CL_c$ increases over time because water molecules are produced by the ORR and water transport from the cathode side to the anode side increases. For these reasons, the water content of the polymer membrane increases due to back diffusion caused by an increase in water molecules at the cathode side at low RH, leading to a decreased resistance to proton transfer in the polymer membrane. For MEA-C at 50% RH, the water transport from the cathode side to the anode side may not be changed due to the high concentration of water at the $CL_c$. During the operation of the cell at a constant current density, the amount of water at the $CL_c$ increases over time, and thus back diffusion from the cathode side to the anode side is enhanced. It can be noted that the direction of water transport via the polymer membrane is not changed as compared to the MEA-N. For MEA-N and MEA-C/A, the difference in the voltage between the two MEAs is not significantly different. Although the concentration of water in the catalyst layers of MEA-C/A is greater than that in MEA-N, the difference in the water concentration between the $CL_a$ and $CL_c$ of MEA-C/A is similar to that of MEA-N. This phenomenon has little influence on the water transport through the polymer membrane.

During the fabrication of the Nafion-based catalyst layer with silica, phase separation occurs between the hydrophilic sulfonic acid groups and the hydrophobic backbone in the Nafion ionomer, resulting in a spherical ionic cluster structure interconnected by narrow channels of sulfonic acid groups. Potentially, the SiO$_2$ nanoparticles can be impregnated into the negatively charged, spherical —SO$_3^-$ groups due to the high $\zeta$ potential of the silica surface at low pH, resulting in a core-shell structure in the electrode. Doping silica in the Nafion ionomer will have two opposing effects on proton transport in the catalyst layer. A desirable effect is that the concentration of water will be increased by the formation of hydrogen bonds between water and the hydroxyl groups of the silica. An undesirable effect is that the proton pathway will be blocked by silica particles due to the high silica content, as well as the large size of the silica particles and the residual ethyl groups on the surface of the silica. However, the Nafion-based catalyst layer according to the present disclosure contains approximately 0.9 wt % SiO$_2$ nanoparticles, has smaller sized silica particles and there are no residual ethyl groups to hinder the transfer of protons in the catalyst layer. When the catalyst layer is fully saturated at high RH, the R—SO$_3$H—SiO$_2$ is dissociated fully to form R—SO$_3$H and HO—Si—O in the catalyst layer, which does not have a detrimental effect on the proton conductivity of the Nafion ionomer at high RH. At 100% RH, the proton resistance values in the Nafion ionomer based catalyst layer on the cathode for MEA-N and MEA-C are 8.6 and 7.3 m$\Omega$ cm$^2$, respectively. (The average thicknesses of the catalyst layers of MEA-N and MEA-C on the cathode are 24.4±0.7 and 24.7±0.8 µm, respectively). Further, FIG. 10e shows the cathode charge transfer resistance, which consists of electron and proton transfer resistance, at the interface between the Pt catalyst and the binder as a function of current density. At 100% RH, the cathode charge transfer resistance of MEA-C is much lower than the resistance of the others. These results are very impressive because the addition of excessive quantities of oxide particles may decrease the charge transfer dynamics (proton and/or electron) of the electrodes due to the insulating properties of the oxide particles. Vulcan carbon contains heterocyclic sulfur that associates preferentially with colloidal particles and, therefore, strongly binds the silica colloids. If the SiO$_2$ nanoparticles are associated closely with Vulcan carbon, the interfacial contact between the Vulcan carbons decreases, resulting in a significant increase of the resistance to electron charge transfer. However, graphitic carbon is used as the supporting material for Pt according to the present disclosure. Consequently, it is possible to decrease the effect of heterocyclic sulfur on the aggregation of silica colloids. Further, the core-shell structure of the SiO$_2$ nanoparticles and Nafion ionomer does not restrict the interfacial contact between the graphitic carbons. In other words, this indicates that self-assembled Nafion-SiO$_2$ does not deteriorate the interfacial contact between graphitic carbon particles due to the very small size distribution of the SiO$_2$ nanoparticles and the core-shell structure. It is determined that the self-assembled Nafion ionomers with small silica particles exist in the catalyst layer in which there are well connected pathways for proton hopping at high RH, which contributes toward a reduction of the charge transfer resistance in the catalyst layer.

At 50% RH, the proton resistance values in the catalyst layers for MEA-N and MEA-C are 119.3 and 91.2 mΩ cm², respectively. Further, at 50% RH, the cathode charge transfer resistance of MEA-C is much lower than the resistance of the others, indicating that the chemically adsorbed water molecules in the $SiO_2$ nanoparticles are released into the Nafion binder, thereby increasing proton hopping through the hydrogen bond network of the water molecules in the catalyst layer.

EXAMPLES

The examples and experiments will now be described. The following examples and experiments are for illustrative purposes only and not intended to limit the scope of this disclosure.

Tetraethoxysilane (TEOS) (99.999%, Sigma-Aldrich Co.) was used as the oxide precursor. Commercial Pt supported on graphitized carbon (60 wt %, Johnson-Matthey) was prepared by mixing solutions with 2-propanol, deionized (DI) water and a solution of Nafion DE 521 (5 wt % Nafion, 45±3 wt % water, 48±3 wt % 1-propanol, <4 wt % ethanol with an ion exchange capacity (IEC) of 0.95-1.03 meq g$^{-1}$, DuPont) without acid or base.

The anode and cathode Pt loadings were approximately 0.50 mg$_{Pt}$ cm$^{-2}$ and all the cathodes and/or anodes had 30 wt % ionomer and around 0.9 wt % $SiO_2$. In order to make the catalyst ink, a mixture of Pt/C and the Nafion ionomer was sonicated for 20 min and mixed by a stirrer for 40 min. Subsequently, the selected catalyst ink was prepared by adding equal masses of the TEOS solution and the solid Nafion ionomer into a prepared mixture of the catalyst ink. The anode and cathode catalyst inks were sonicated for an additional 10 min and then stirred for 20 min. The MEA with an active area of 25 cm² was fabricated by the spray method on a 50 μm-thick Nafion NRE 212 membrane (DuPont). Then, the MEA was dried at 80° C. to remove the residual solvents and to further promote the polycondensation reaction, through which $H_2O$ and $C_2H_5OH$ are removed.

The anode and cathode gases were humidified by passing them through bubbler-type humidifiers. Before the unit cell operation began, the humidifiers of both the cathode and anode were calibrated with a humidity sensor (Viasensor HS-1000). All of the unit cell experiments were conducted at 70° C. and the temperature of the gas lines to the anode and the cathode were always set at 10° C. above the temperature of the humidifier to avoid the condensation of water vapor. At a current less than 10 A, the anode was fed with humidified $H_2$ gas at a constant flow rate of 100 mL min$^{-1}$ and the cathode was fed with humidified air at a constant flow rate of 410 mL min$^{-1}$ (all at ambient pressure). At a current greater than 10 A, the stoichiometric quantities of $H_2$ and air were 1.43 and 2.5, respectively. Polarization experiments were conducted in a galvanostatic mode. An electronic load was used to maintain a constant current. At each current, the cell was allowed to stabilize for 18 min before the voltage of the cell was measured.

Electrochemical impedance spectroscopy (EIS) measurements were conducted using an HCP-803 analyzer (Bio-Logic, Science Instruments). At each current, the cell was allowed to stabilize for 18 min, after which the voltage of the cell was measured. All EIS spectra were obtained under the same operating conditions as a measurement test for the polarization curve. The impedance spectra were measured in a constant current mode at 40, 100, 600, 800, 1000, 1200 and 1400 mA cm$^{-2}$ by sweeping frequencies over a range of 1000 kHz-100 mHz with 20 points/decade. The impedance spectra were fit using ZView software. The cathode and the anode were purged with $N_2$ (1500 mL min$^{-1}$) and $H_2$ (350 mL min$^{-1}$) and then cyclic voltammetry (CV) was performed to measure the electrochemical surface area (ECA) of Pt using an EIS potentiostat. The potential range and the scan rate were 0.04-1.2 V (vs. RHE) and 20 mV s$^{-1}$, respectively. The proton resistance was measured within the electrode via a one-dimensional transmission-line model under an $H_2$-fed anode (reference/counter electrode) and a $N_2$-purged cathode (working electrode). The cathode and the anode were purged with $N_2$ (900 mL min$^{-1}$) and $H_2$ (900 mL min$^{-1}$).

Thermal gravimetric (TG) analysis (TG 209 F3 Tarsus) was performed to obtain information about the total amount of silica in the MEA. The technology, known as $^{29}Si$ solid-state NMR, is a well-established means of determining the coordination environments of $^{29}Si$ nuclei, which provides the condensation degree of the silica network. The MEA-C without Pt/C was cut into very small fragments that loaded onto a 7 mm rotor. Solid-state NMR spectra were recorded on a 400 MHz Bruker Avance spectrometer operating at a frequency of 80 MHz for the $^{29}Si$ nucleus and using the magic-angle spinning technique. The sample spinning rate was 10 kHz.

The morphologies of the silica particles and Pt/C were examined using a transmission electron microscope (TEM) (FEI Tecnai G2-20 STWIN) and a field emission scanning electron microscope (FE-SEM) (Hitachi S-4700). The Si in the catalyst layer was measured by energy dispersive X-ray spectroscopy (EDS) using an FE-TEM (JEM-2100F, Jeol, Japan, Installed at Korea Basic Science Institute) instrument. X-Ray diffraction (XRD) patterns were recorded on a Rigaku D-max-2500 X-ray diffractometer (Cu-Kα radiation, λ=1.5406 Å) in the 2θ angular range of 10-80° with a velocity of 0.02°/4 s.

The size distribution of the ionomer in the Nafion solution was measured with a dynamic light scattering (DLS) spectrometer (Zetasizer Nano ZS, Malvern Instruments). The distributions of the pore sizes of the catalyst layers were obtained by mercury porosimetry (Autopore IV 9500, Micromeritics). Specific surface areas were determined by the Brunauer-Emmett-Teller (BET) method with Micromeritics ASAP 2010 using liquid $N_2$ at 77° K. The total pore volume was calculated from the amount of vapor adsorbed at a relative pressure (P/P$_0$) close to unity, where P and P$_0$ are the measured and the equilibrium pressures, respectively. This calculation assumes that all the pores are filled with condensed $N_2$ in the normal liquid state. Once the relative pressure at the beginning of the hysteresis was obtained, the pore size distribution was established using the Barrett-Joyner-Halenda (BJH) method.

A humidity sensor (Viasensor HS-1000) was used to measure the vapor pressure of water at a constant current density of 400 mA cm$^{-2}$. A humidity sensor was connected at the outlet of the anode in order to compare the water transport via the polymer membrane.

While the present disclosure has been described with respect to the specific embodiments, it will be apparent to those skilled in the art that various changes and modifications may be made without departing from the spirit and scope of the disclosure as defined in the following claims.

What is claimed is:

1. A polymer electrolyte fuel cell comprising a membrane-electrode assembly for a fuel cell and a fuel, wherein the membrane-electrode assembly comprises a cathode, an anode and an electrolyte membrane disposed between the cathode and the anode, wherein the cathode comprises a first support and a cathode electrode catalyst layer, the anode comprises a second support and an anode electrode catalyst layer, a hygroscopic inorganic material is contained in the cathode electrode catalyst layer, and no hygroscopic inorganic material is contained in the anode electrode catalyst layer, wherein the fuel is hydrogen gas and is applied to the anode, and wherein the hygroscopic inorganic material is silica nanoparticles, and the silica nanoparticles are amorphous nanoparticles having an average particle size of less than 5 nm; the silica nanoparticles have a Q3/Q4 ratio of 1-3 (based on $^{29}$Si NMR spectra), and Q3 means the number of silicon atoms bonded to three other silicon atoms through oxygen, and Q4 means the number of silicon atoms bonded to four other silicon atoms through oxygen; no Si resonance peak is observed in $^{29}$Si NMR spectra for determination of non-hydrolyzed TEOS; and the electrode catalyst layers provide a current density of 400-800 mA/cm$^2$ at 0.6 V under 50% RH of H$_2$/air, and show a mass activity value of 15-25 A/g$_{pt}$ at 0.9 Va$_{iR\text{-}free}$ under 50% RH.

2. The polymer electrolyte fuel cell according to claim 1, wherein the silica nanoparticles are derived from TEOS.

* * * * *

UNITED STATES PATENT AND TRADEMARK OFFICE
CERTIFICATE OF CORRECTION

PATENT NO.       : 9,559,363 B2
APPLICATION NO.  : 13/742975
DATED            : January 31, 2017
INVENTOR(S)      : Yim et al.

Page 1 of 1

It is certified that error appears in the above-identified patent and that said Letters Patent is hereby corrected as shown below:

In the Claims

Column 17,
Line 26, "0.9 Va$_{iR\text{-free}}$" should read --0.9 V$_{iR\text{-free}}$--.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*